United States Patent
Stevenson et al.

(10) Patent No.: US 12,474,339 B2
(45) Date of Patent: Nov. 18, 2025

(54) SYSTEMS AND METHODS FOR SPECTRAL IMAGING CHARACTERIZATION OF MACROPHAGES FOR USE IN PERSONALIZATION OF TARGETED THERAPIES TO PREVENT FIBROSIS DEVELOPMENT IN PATIENTS WITH CHRONIC LIVER DISEASE

(71) Applicant: Board of Regents, The University of Texas System, Austin, TX (US)

(72) Inventors: Heather Stevenson, Galveston, TX (US); Omar Saldarriaga, League City, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 962 days.

(21) Appl. No.: 17/079,236

(22) Filed: Oct. 23, 2020

(65) Prior Publication Data
US 2021/0293814 A1    Sep. 23, 2021

Related U.S. Application Data

(60) Provisional application No. 62/926,264, filed on Oct. 25, 2019.

(51) Int. Cl.
*G01N 33/569* (2006.01)
*G01N 21/64* (2006.01)
*G01N 33/58* (2006.01)

(52) U.S. Cl.
CPC ... *G01N 33/56966* (2013.01); *G01N 21/6428* (2013.01); *G01N 21/6458* (2013.01); *G01N 33/582* (2013.01); *G01N 2021/6439* (2013.01); *G01N 2800/085* (2013.01)

(58) Field of Classification Search
CPC .......... G01N 33/56966; G01N 33/582; G01N 2800/085; G01N 33/48
See application file for complete search history.

(56) References Cited

PUBLICATIONS

Liaskou et al. Monocyte Subsets in Human Liver Disease Show Distinct Phenotypic and Functional Characteristics. Hepatology 57 (1): 285-398 (Jan. 2013).*

(Continued)

*Primary Examiner* — Gailene Gabel
(74) *Attorney, Agent, or Firm* — Edwin S. Flores; Daniel J. Chalker; Chalker Flores, LLP

(57) ABSTRACT

The present invention includes a method of macrophage phenotype profiling for the assessment, determination, and stratification of risk of development of fibrosis and/or cirrhosis within the liver, and treatment thereof, comprising the steps of: (a) obtaining a liver biopsy sample from a subject; (b) using fluorescently labeled antibodies to analyze the sample, by laboratory assay, for marker identification and expression comparison of one or more macrophage profiling markers relative to the level of expression of a macrophage profiling marker in at least one control or standard sample; and (c) using spectral analysis to correlate the fluorescent signal generated by the macrophage profiling marker/antibody complex to the risk of developing fibrosis and/or cirrhosis, and treating with anti-viral agents or changes in diet, weight loss, or reduction of fat consumption.

21 Claims, 8 Drawing Sheets

| Antibodies used to identify intrahepatic macrophages | |
|---|---|
| Macrophage: Parent Cell Markers | |
| Tissue resident Kupffer cells | CD68+ |
| Tissue remodeling/ Pro-fibrotic | CD163+ |
| Systemic monocytes | Mac387+ |
| Markers analyzed by level of expression on parent cells | |
| Classical (pro-inflammatory) macrophages | CD14++/CD16- |
| Intermediate macrophages | CD14++/CD16+ |
| Non-classical (anti-inflammatory) macrophages | CD14+/CD16++ |

(56) References Cited

PUBLICATIONS

Huang et al. Increase in Infiltrating Monocytes in the Livers of Patients with Chronic Liver Diseases. Discovery Medicine 21 (113):25-33 (Jan. 2016).*

Shabo et al. Expression of Macrophage Antigens by Tumor Cells. Chapter 7: pp. 141-148. Advances in Experimental Medicine and Biology (2011).*

Levinson et al. Multiplexing and Multispectral Imaging: From Mice to Microscopy. ILAR Journal 49 (1): 78-88 (2008).*

AASLD-IDSA—"Hepatitis C Guidance 2018 Update: AASLD-IDSA Recommendations for Testing, Managing, and Treating Hepatitis C Virus Infection", 2018 AASLD-IDSA Hepatitis C Guidance • CID 2018:67 (Nov. 15).

Bility et al., "Chronic hepatitis C infection-induced liver fibrogenesis is associated with M2 macrophage activation", Scientific Reports, 6:39520, DOI: 10.1038/srep39520. Dec. 21, 2016.

Chalasani et al., "The Diagnosis and Management of Nonalcoholic Fatty Liver Disease: Practice Guidance From the American Association for the Study of Liver Diseases", Hepatology, vol. 67, No. 1, 2018.

Feng et al., Multispectral imaging of formalin-fixed tissue predicts ability to generate tumor-infiltrating lymphocytes from melanoma, Feng et al. Journal for Immuno Therapy of Cancer (2015) 3:47, Journal fr Immuno Therapy of Cancer.

Friedman et al., "Efficacy and safety study of cenicriviroc for the treatment of non-alcoholic steatohepatitis in adult subjects with liver fibrosis: CENTAUR Phase 2b study design", Elsevier, Contemporary Clinical Trials 47, 2016, 356-365.

Friedman et al., A Randomized, Placebo-Controlled Trial of Cenicriviroc for Treatment of Nonalcoholic Steatohepatitis With Fibrosis, Hepatology, vol. 67, No. 5, 2018.

Gadd et al., "Portal, but not lobular, macrophages express matrix metalloproteinase-9: association with the ductular reaction and fibrosis in chronic hepatitis C", Viral Hepatitis, Liver International, 2013.

Guo et al., "The study of fiver macrophages polarization in patients with autoimmune hepatitis", Chin J. Intern Med., Oct. 2017, vol. 56, No. 10, English Abstract.

Hennes et al., Simplified Criteria for the Diagnosis of Autoimmune Hepatitis, Autoimmune, Cholestatic and Biliary Disease, Hepatology, Jul. 2008.

Huang et al., "A colorful future of quantitative pathology: validation of Vectra technology using chromogenic multiplexed immunohistochemistry and prostate tissue microarrays", Elsevier, Human Pathology (2013) 44, 29-38.

Huang et al., "Image analysis of liver biopsy samples measures fibrosis and predicts clinical outcome", Research Article, Journal of Hepatology, 2014, vol. 61, 22-27.

Kazankov et al., "The role of macrophages in nonalcoholic fatty liver disease and nonalcoholic steatohepatitis", NAFLD and NASH, Gastroenterology and Hepatology, vol. 16, Mar. 2019.

Kleiner et al., "Design and Validation of a Histological Scoring System for Nonalcoholic Fatty Liver Disease", Hepatology, vol. 41, No. 6, 2005.

Knodell et al., "Formulation and Application of a Numerical Scoring System for Assessing Histological Activity in Asymptomatic Chronic Active Hepatitis", Hepatology, vol. 1, No. 5, 1981.

Krenkel et al., "Therapeutic Inhibition of InflammatoryMonocyte Recruitment Reduces Steatohepatitis and Liver Fibrosis", Hepatology, vol. 67, No. 4, 2018.

Lin et al., "Altered function of monocytes/macrophages in patients with autoimmune hepatitis", Molecular Medicine Reports 13: 3874-3880, 2016.

Liu et al., "Resistance to Antiangiogenic Therapy Is Associated with an Immunosuppressive Tumor Microenvironment in Metastatic Renal Cell Carcinoma", Published OnlineFirst May 26, 2015; DOI: 10.1158/2326-6066.CIR-14-0244.

Manns et al., "Diagnosis and Management of Autoimmune Hepatitis", Hepatology, Jun. 2010.

Mano et al., "Tumor-Associated Macrophage Promotes Tumor Progression via STAT3 Signaling in Hepatocellular Carcinoma", Pathobiology 2013;80:146-154.

Mlecnik et al., "The tumor microenvironment and Immunoscore are critical determinants of dissemination to distant metastasis", Research Article, Feb. 24, 2016, vol. 8, Issue 327 327ra26.

Reid et al., "Kupffer Cells Undergo Fundamental Changes during the Development of Experimental NASH and Are Critical in Initiating Liver Damage and Inflammation", Research Article, PLOS one, Jul. 25, 2016.

Rockey et al., "Liver Biopsy", AASLD Position Paper, Hepatology, Mar. 2009.

Siddiqui et al., "Case Definitions for Inclusion and Analysis of Endpoints in Clinical Trials for Nonalcoholic Steatohepatitis Through the Lens of Regulatory Science", Special Article, Hepatology, vol. 67, No. 5, 2018.

Stack et al., "Multiplexed immunohistochemistry, imaging, and quantitation: A review, with an assessment of Tyramide signal amplification, multispectral imaging and multiplex analysis", Elsevier, Methods, 70, 2014, 46-58.

Stack et al, "Multiplexed tissue biomarker imaging", Journal for ImmunoTherapy of Cancer, BioMed Central, 2016, 4:9.

Tacke et al., "Macrophage heterogeneity in liver injury and fibrosis", Journal of Hepatology, EASL, 2014 vol. 60, 1090-1096.

Tacke, "Cenicriviroc for the treatment of non-alcoholic steatohepatitis and liver fibrosis", Expert Opninion on Investigational Drugs, ISSN: 1354-3784, Feb. 16, 2018.

Yeung et al., "Alternatively activated (M2) macrophages promote tumour growth and invasiveness in hepatocellular carcinoma", Journal of Hepatology, Research Article, 2015, vol. 62, pp. 607-616.

Zaretsky et al., "Mutations Associated with Acquired Resistance to PD-1 Blockade in Melanoma", The New Engand Journal of Medicine, Sep. 1, 2016, vol. 375, No. 9.

Zhang et al., "Receptor-interacting protein kinase 3 mediates macrophage/monocyte activation in autoimmune hepatitis and regulates interleukin-6 production", United European Gastroenterology, 2018, vol. 6, (5) 719-728.

\* cited by examiner

FIGURE 2

| Antibodies used to identify intrahepatic macrophages | | | | |
|---|---|---|---|---|
| Macrophage: Parent Cell Markers | | | | |
| Tissue resident Kupffer cells | CD68+ | | | |
| Tissue remodeling/ Pro-fibrotic | | CD163+ | | |
| Systemic monocytes | | | Mac387+ | |
| Markers analyzed by level of expression on parent cells | | | | |
| Classical (pro-inflammatory) macrophages | | | | CD14++/CD16- |
| Intermediate macrophages | | | | CD14++/CD16+ |
| Non-classical (anti-inflammatory) macrophages | | | | CD14+/CD16++ |

SYSTEMS AND METHODS FOR SPECTRAL IMAGING CHARACTERIZATION OF MACROPHAGES FOR USE IN PERSONALIZATION OF TARGETED THERAPIES TO PREVENT FIBROSIS DEVELOPMENT IN PATIENTS WITH CHRONIC LIVER DISEASE

CROSS-REFERENCE TO RELATED APPLICATIONS

This application claims priority to U.S. Provisional Application Ser. No. 62/926,264, filed Oct. 25, 2019, the entire contents of which are incorporated herein by reference.

INCORPORATION-BY-REFERENCE OF MATERIALS FILED ON COMPACT DISC

None.

TECHNICAL FIELD OF THE INVENTION

The present invention relates generally to the field of disease assessment and detection using spectral image analysis.

STATEMENT OF FEDERALLY FUNDED RESEARCH

None.

BACKGROUND OF INVENTION

Cirrhosis and hepatocellular carcinoma (HCC) represent increasing health and economic burdens in the U.S and around the world. Non-alcoholic fatty liver disease/steatohepatitis (NAFLD/NASH), hepatitis C virus (HCV) and autoimmune hepatitis (AIH) are common etiologies. In the United States, NAFLD is predicted to increase from 83.1 million cases in 2015 to 100.9 million in 2030. Although direct-acting antivirals (DAA) are now available to treat HCV, the CDC estimates that the incidence of HCV infection is on the rise due to the opioid epidemic and will go largely unnoticed in the absence of comprehensive screening. Certain patients with chronic active AIH respond to immune suppression and others progress to end-stage liver disease and HCC. However, only a small percentage of patients with chronic liver disease will develop cirrhosis (~5-20%). Better techniques are needed for predicting the risk of developing these poor outcomes when treatment options remain viable.

Stellate cells have been extensively studied in the development of hepatic fibrosis and represent less than 1% of nonparenchymal cells in the liver, while Kupffer cells, the resident macrophages in the liver, make up greater than 20%. Kupffer cells are one of the first cells to encounter antigens contained in the blood and are critical in maintaining hepatic immune tolerance. Once activated, they can increase recruitment of systemic macrophages into the liver, which enhances liver injury and the development of fibrosis. Liver macrophages greatly influence the composition of the hepatic microenvironment, host immune response to infection, and subsequent development of fibrosis.

Studying intrahepatic macrophages is challenging for several reasons: (i) they are difficult to isolate from human liver tissue, (ii) they become activated and change their phenotype when manipulated, and (iii) in vitro and mouse model systems of chronic liver injury do not closely mimic the long-term diseases that are observed in humans. Hence, systems and methods that permit the study of intrahepatic macrophages and their interaction with other components in host immunity in human liver tissue are timely and critical. Technology advances are needed to assess and determine a patient's intrahepatic macrophage profile to be able to predict their risk of developing adverse clinical outcomes in the future.

SUMMARY OF THE INVENTION

Systems and methods of the current invention include, but are not limited to, a pioneering method to phenotype cells in situ in human liver biopsy tissue using spectral imaging microscopy with advanced imaging analysis. The current invention utilizes immunohistochemistry to stain multiple markers on intrahepatic macrophages (CD68, Mac387, CD163, CD14, CD16, and DAPI) in the liver of patients with non-alcoholic fatty liver disease/steatohepatitis (NAFLD/NASH), hepatitis C virus (HCV), and/or autoimmune hepatitis (AIH). Once cells with these parent markers are identified, the level of expression of CD14 and CD16 is assessed and determined on circulating monocytes by flow cytometry. However, spectral imaging does not compromise the hepatic architecture like other techniques, allowing for the assessment and determination of the location of these cells within the complex microenvironment. The present invention demonstrates that patients have variable macrophage phenotypes in their liver depending on the type of liver disease and their propensity to develop hepatic fibrosis in the future. Some patients have larger numbers of tolerogenic/anti-inflammatory macrophages, characterized by CD68+/CD16++ or Mac387+/CD16++, while others have larger numbers of resident pro-inflammatory macrophages characterized by CD68+/CD14++ or Mac387+/CD14++. In another aspect, the method further comprises determining if one or more genes are upregulated, downregulated, or both, as set forth in Table 4 or Table 5. In another aspect, the method further comprises determining if one or more genes are upregulated, downregulated, or both, selected from CCL1, CCL13, CXCL8, HMGB1, HLA-DR, HLA-DPB1, HLA-DRB1, CD74, NOS2, ROS1, MMP2, MMP9, TGM2, HMOX1, CHI3L1, TIMP1, MMP12, MMP13, ALOX15, LLGL1, PTGS1, CYP2S1, PPARGC1A, PPARGC1B, LYZ, TGFB3, LGALS3, LGALS9, PTEN, SERPINE1, COL6A3, FCN1, IL-6, PDGFA, PDGFB, VEGF, IGF-1, IL1RN, TNFR1, P2RY1, SOCS3, AKT1, S100A12, AKT2, PFKFB3, TSC1, mTOR, BMP3, FABP4, NR1H3, PI3K, KRAS, NRAS, SOCSS2, PRKAA1, PFKFB1, SHPK, MIR27A, TYROBP, VSIG4, CSAR1, VCAM1, STATSA, C-JUN, NFKB/RELA, NFKB/RELB, GATA6, KLF4, EPAS1, EP1, H1F1A, MYC, SMAD1-9, CSF1, FCRG, SLAMF1/CD150, 1L13RA1, IL13RA2, CCR2, S100A8, CXCL6, CCL21, PLAU, CD27, CXCR3, CEACAM6, F13A1, ANXA1, CTLA4, CCL19, MS4A1, ITGA2, ITGB4, IL8, RAS, CDK1. Thus, patients with different types of chronic liver diseases have unique intrahepatic macrophage profiles and receptor expression that will be able to predict their risk of later developing hepatic fibrosis and/or cirrhosis. The system and method of the current invention determines a patient's intrahepatic macrophage profile to predict their risk of developing adverse clinical outcomes in the future and enable earlier intervention, proper surveillance, and treatment.

In one embodiment, the present invention includes a method of macrophage phenotype profiling for assessment, determination, and stratification of risk of development of fibrosis and/or cirrhosis within the liver, comprising the steps of: (a) obtaining a liver biopsy sample from a subject; (b) using a fluorescent probe to analyze the sample for marker identification and expression comparison of one or more macrophage profiling markers relative to a level of expression of a macrophage profiling marker in at least one control or standard sample; and (c) using spectral analysis to correlate the fluorescent signal generated by the macrophage profiling marker/antibody complex to the risk of developing fibrosis and/or cirrhosis. In one aspect, the macrophage profiling markers are surface bound protein markers, secreted protein markers, and/or a combinations thereof. In another aspect, the macrophage profiling markers comprise at least 2, 3, 4, 5 or 6 markers selected from CD68, Mac387, CD163, CD14, CD16, and DAPI. In another aspect, the macrophage profiling markers comprise at least 2, 3, 4, 5 or 6 markers selected from CD163, CD206, CD16, TGF-β/IL-10, MMP1, and DAPI. In another aspect, the fluorescent probes have a special functional group with a spectral emission between 400-800 nm. In another aspect, the sample is selected from the group consisting of liver tumor tissue, liver normal tissue, frozen biopsy tissue, paraffin-embedded biopsy tissue, serum, plasma, and combinations thereof. In another aspect, the detection of the macrophage profiling marker/antibody complex is achieved by using spectral imaging microscopy and advanced imaging analysis. In another aspect, the spectral imaging microscopy is utilized to conserve the hepatic architecture for the assessment and determination of the location of these cells within the complex microenvironment. In another aspect, artificial intelligence and/or machine learning is employed to automatically identify, quantify correlate marker expression levels between samples and controls and/or standards. In another aspect, the macrophage profiling marker/antibody complex shows tolerogenic/anti-inflammatory macrophages that are CD68+/CD16++ or Mac387+/CD16++. In another aspect, the macrophage profiling marker/antibody complex shows resident pro-inflammatory macrophages characterized by CD68+/CD14++ or Mac387+/CD14++. In another aspect, if the patient has fibrosis and the macrophage profiling marker/antibody complex shows CD163+/CD16+, CD68+/Mac387+, and CD68+ macrophages this is indicative of fibrosis due to chronic hepatitis C (HCV+) macrophages. In another aspect, if the patient has fibrosis and the macrophage profiling marker/antibody complex shows CD163+/Mac387+, CD16+/CD163+/Mac387+, and CD68+ macrophages these patients have non-alcoholic steatohepatitis (NASH) macrophages. ++. In another aspect, the method further comprises determining if one or more genes are upregulated, downregulated, or both, as set forth in Table 4 or Table 5. In another aspect, the method further comprises determining if one or more genes are upregulated, downregulated, or both, selected from CCL1, CCL13, CXCL8, HMGB1, HLA-DR, HLA-DPB1, HLA-DRB1, CD74, NOS2, ROS1, MMP2, MMP9, TGM2, HMOX1, CHI3L1, TIMP1, MMP12, MMP13, ALOX15, LLGL1, PTGS1, CYP2S1, PPARGC1A, PPARGC1B, LYZ, TGFB3, LGALS3, LGALS9, PTEN, SERPINE1, COL6A3, FCN1, IL-6, PDGFA, PDGFB, VEGF, IGF-1, IL1RN, TNFR1, P2RY1, SOCS3, AKT1, S100A12, AKT2, PFKFB3, TSC1, mTOR, BMP3, FABP4, NR1H3, P13K, KRAS, NRAS, SOCSS2, PRKAA1, PFKFB1, SHPK, MIR27A, TYROBP, VSIG4, CSAR1, VCAM1, STATSA, C-JUN, NFKB/RELA, NFKB/RELB, GATA6, KLF4, EPAS1, EP1, H1F1A, MYC, SMAD1-9, CSF1, FCRG, SLAMF1/CD150, 1L13RA1, 1L13RA2, CCR2, S100A8, CXCL6, CCL21, PLAU, CD27, CXCR3, CEACAM6, F13A1, ANXA1, CTLA4, CCL19, MS4A1, ITGA2, ITGB4, IL8, RAS, and CDK1.

In another embodiment, the present invention includes a method of macrophage phenotype profiling for assessment, determination, and stratification of risk of development of fibrosis and/or cirrhosis within the liver, comprising the steps of: obtaining an image of a fluorescently labeled liver biopsy sample from a subject, the image comprising CD68, Mac387, CD163, and DAPI, and using spectral analysis to calculate a relative level of expression of the macrophage profiling marker in the sample to at least one control or standard sample, wherein a change in the expression of CD68, Mac387, CD163, and DAPI correlated to the risk of developing fibrosis and/or cirrhosis. In one aspect, the macrophage profiling markers further comprise CD14 and CD16. In another aspect, the method further comprises measuring an anti-inflammatory/restorative markers comprising at least 2, 3, 4, 5 or 6 markers selected from CD163, CD206, CD16, TGF-β/IL-10, MMP1, and DAPI. In another aspect, the macrophage profiling markers are surface bound protein markers, secreted protein markers, and/or a combinations thereof. In another aspect, the fluorescent probes have a special functional group with a spectral emission between 400-800 nm. In another aspect, the sample is selected from the group consisting of liver tumor tissue, liver normal tissue, frozen biopsy tissue, paraffin-embedded biopsy tissue, serum, plasma, and combinations thereof. In another aspect, the detection of the macrophage profiling marker/antibody complex is achieved by using spectral imaging microscopy and advanced imaging analysis. In another aspect, the spectral imaging microscopy is utilized to conserve the hepatic architecture for the assessment and determination of the location of these cells within the complex microenvironment. In another aspect, artificial intelligence and/or machine learning is employed to automatically identify, quantify correlate marker expression levels between samples and controls and/or standards. In another aspect, the macrophage profiling marker/antibody complex shows tolerogenic/anti-inflammatory macrophages that are CD68+/CD16++ or Mac387+/CD16++. In another aspect, the macrophage profiling marker/antibody complex shows resident pro-inflammatory macrophages characterized by CD68+/CD14++ or Mac387+/CD14++. In another aspect, if the patient has fibrosis and the macrophage profiling marker/antibody complex shows CD163+/CD16+, CD68+/Mac387+, and CD68+ macrophages this is indicative of fibrosis due to chronic hepatitis C (HCV+) macrophages. In another aspect, if the patient has fibrosis and the macrophage profiling marker/antibody complex shows CD163+/Mac387+, CD16+/CD163+/Mac387+, and CD68+ macrophages these patients have non-alcoholic steatohepatitis (NASH) macrophages. ++. In another aspect, the method further comprises determining if one or more genes are upregulated, downregulated, or both, as set forth in Table 4 or Table 5. In another aspect, the method further comprises determining if one or more genes are upregulated, downregulated, or both, selected from CCL1, CCL13, CXCL8, HMGB1, HLA-DR, HLA-DPB1, HLA-DRB1, CD74, NOS2, ROS1, MMP2, MMP9, TGM2, HMOX1, CHI3L1, TIMP1, MMP12, MMP13, ALOX15, LLGL1, PTGS1, CYP2S1, PPARGC1A, PPARGC1B, LYZ, TGFB3, LGALS3, LGALS9, PTEN, SERPINE1, COL6A3, FCN1, IL-6, PDGFA, PDGFB, VEGF, IGF-1, IL1RN, TNFR1, P2RY1, SOCS3, AKT1, S100A12, AKT2, PFKFB3, TSC1, mTOR, BMP3, FABP4, NR1H3, P13K, KRAS, NRAS, SOCSS2, PRKAA1, PFKFB1, SHPK, MIR27A, TYROBP, VSIG4, CSAR1, VCAM1, STATSA, C-JUN, NFKB/RELA, NFKB/RELB, GATA6, KLF4, EPAS1, EP1, H1F1A, MYC, SMAD1-9, CSF1, FCRG, SLAMF1/CD150, 1L13RA1, 1L13RA2, CCR2, S100A8, CXCL6, CCL21, PLAU, CD27, CXCR3, CEACAM6, F13A1, ANXA1, CTLA4, CCL19, MS4A1, ITGA2, ITGB4, IL8, RAS, and CDK1.

In yet another embodiment, the present invention includes a method for treating a patient based on a stratification of risk of development of fibrosis and/or cirrhosis within the liver, the method comprising the steps of: obtaining an image of a fluorescently labeled liver biopsy sample from a subject, the image comprising 1, 2, 3, 4, 5 or 6 macrophage profiling markers selected from CD68, Mac387, CD163, CD14, CD16, and DAPI; determining whether the patient has Non-alcoholic fatty liver disease/steatohepatitis (NAFLD/NASH), hepatitis C virus (HCV), and/or autoimmune hepatitis (AIH) based on a comparison of the 1, 2, 3, 4, 5 or 6 macrophage profiling markers selected from CD68, Mac387, CD163, CD14, CD16, and DAPI in the patient sample when compared to a level of expression of a macrophage profiling marker in at least one control or standard sample; and if the patient has a hepatitis C virus (HCV) liver macrophage profile, then treating the patient with an antiviral agent, or if the patient has an autoimmune hepatitis (AIH) liver macrophage profile, then treating the patient with an immune suppression agent; and if the patient has a non-alcoholic fatty liver disease/steatohepatitis (NAFLD/NASH) liver macrophage profile, then treating the patient with changes in diet, weight loss, or reduction of fat consumption. In one aspect, the method further comprises measuring an anti-inflammatory/restorative markers comprising at least 2, 3, 4, 5 or 6 markers selected from CD163, CD206, CD16, TGF-β/IL-10, MMP1, and DAPI. ++. In another aspect, the method further comprises determining if one or more genes are upregulated, downregulated, or both, as set forth in Table 4 or Table 5. In another aspect, the method further comprises determining if one or more genes are upregulated, downregulated, or both, selected from CCL1, CCL13, CXCL8, HMGB1, HLA-DR, HLA-DPB1, HLA-DRB1, CD74, NOS2, ROS1, MMP2, MMP9, TGM2, HMOX1, CHI3L1, TIMP1, MMP12, MMP13, ALOX15, LLGL1, PTGS1, CYP2S1, PPARGC1A, PPARGC1B, LYZ, TGFB3, LGALS3, LGALS9, PTEN, SERPINE1, COL6A3, FCN1, IL-6, PDGFA, PDGFB, VEGF, IGF-1, IL1RN, TNFR1, P2RY1, SOCS3, AKT1, S100A12, AKT2, PFKFB3, TSC1, mTOR, BMP3, FABP4, NR1H3, P13K, KRAS, NRAS, SOCSS2, PRKAA1, PFKFB1, SHPK, MIR27A, TYROBP, VSIG4, CSAR1, VCAM1, STATSA, C-JUN, NFKB/RELA, NFKB/RELB, GATA6, KLF4, EPAS1, EP1, H1F1A, MYC, SMAD1-9, CSF1, FCRG, SLAMF1/CD150, 1L13RA1, 1L13RA2, CCR2, S100A8, CXCL6, CCL21, PLAU, CD27, CXCR3, CEACAM6, F13A1, ANXA1, CTLA4, CCL19, MS4A1, ITGA2, ITGB4, IL8, RAS, and CDK1.

BRIEF DESCRIPTION OF THE DRAWINGS

The above and further advantages of the invention may be better understood by referring to the following descriptions in conjunction with the accompanying drawings, in which:

FIG. 2 is a table with a list of antibodies used to identify intrahepatic macrophages and markers analyzed by level of expression on parent cells according to embodiments of the current invention.

FIG. 6A illustrates a florescent multiplex image. FIG. 6B illustrates the tissue segmentation feature of the software, which allows quantification of the different macrophage phenotypes (FIG. 6C) in both portal tracts and lobules. FIG. 6D illustrates the Visiopharm phenotypic matrix algorithm identifying 16 distinct macrophage phenotypes in one multiplex image obtained from a patient with NASH.

FIG. 7A illustrates a liver biopsy showing minimal fibrosis. Only the portal tracts are staining due to normal fibrous septa; this is similar to the pattern observed in controls. FIG. 7B illustrates a cirrhosis patient with bands of bridging fibrosis and large areas of parenchymal extinction. FIG. 7C illustrates t-SNE analysis of all markers in patients FIG. 7A and FIG. 7B versus controls demonstrating the 6-color multiplex panel is able to identify unique profiles in these different patients.

DETAILED DESCRIPTION OF THE INVENTION

Figure 1:
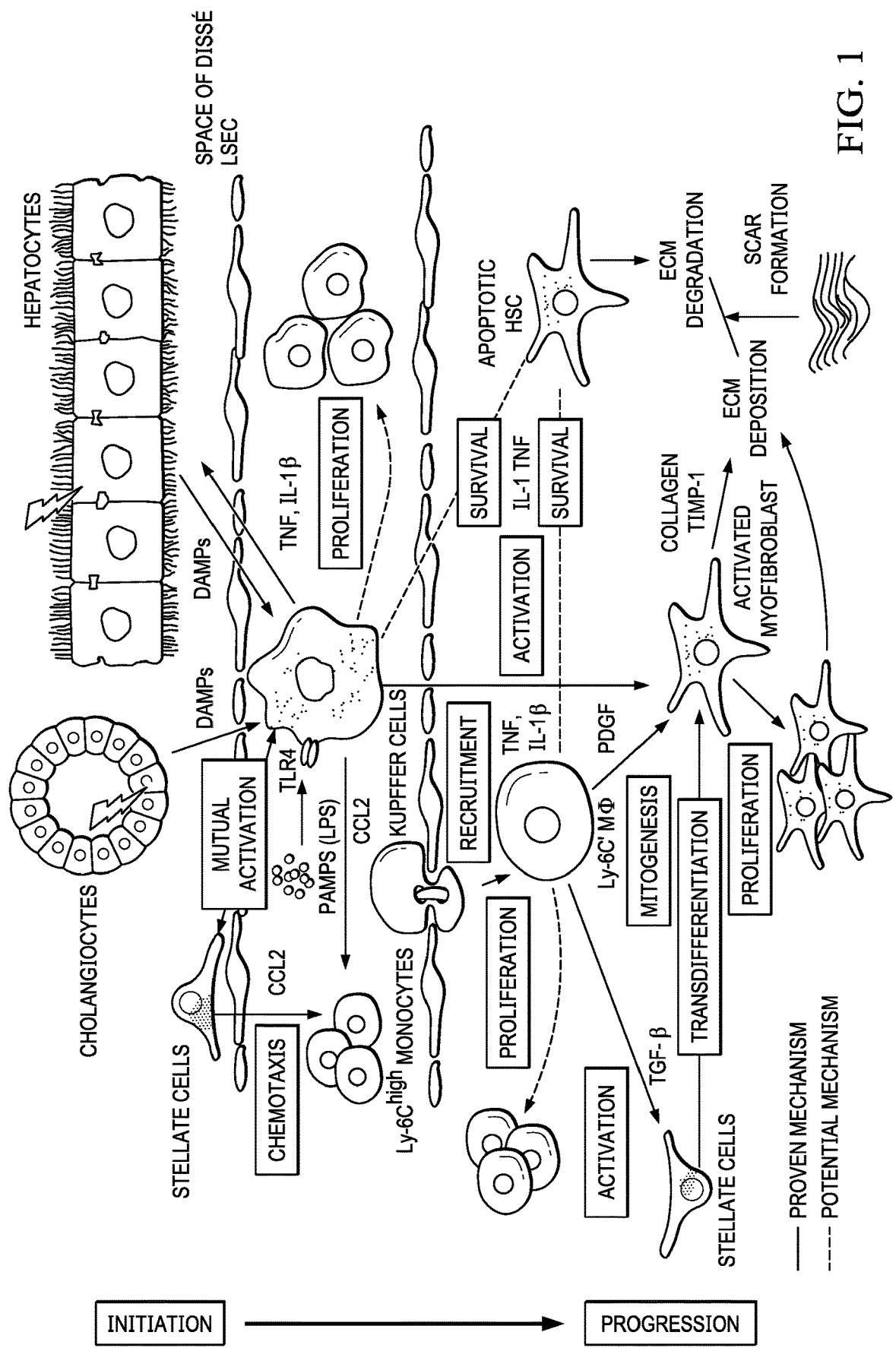
FIG. 1 is a schematic of macrophage heterogeneity according to embodiments of the current invention.

The current invention now will be described more fully hereinafter with reference to the accompanying drawings, which illustrate embodiments of the invention. This invention may, however, be embodied in many different forms and should not be construed as limited to the illustrated embodiments set forth herein. These embodiments are provided so that this disclosure will be thorough and complete, and will fully convey the scope of the invention to those skilled in the art.

The present invention includes compositions and methods to phenotype, in situ, human liver biopsy tissue using spectral imaging microscopy with advanced imaging analysis. The invention includes the use of multiple markers on intrahepatic macrophages (CD68, Mac387, CD163, CD14, CD16, and a nuclear counter stain, e.g., 4',6-diamidino-2-phenylindole (DAPI)) in the liver of patients with non-alcoholic fatty liver disease/steatohepatitis (NAFLD/NASH), hepatitis C virus (HCV), and/or autoimmune hepatitis (AIH). Once cells with these parent markers are identified, the level of expression of CD14 and CD16 is determined, similar to previous studies conducted on circulating monocytes by flow cytometry. However, spectral imaging does not compromise the hepatic architecture, allowing a determination of the location of these cells within the complex microenvironment. It has been found that patients have variable macrophage phenotypes in their liver depending on the type of liver disease and their propensity to develop hepatic fibrosis in the future—some have larger numbers of tolerogenic/anti-inflammatory macrophages, characterized by CD68+/CD16++ or Mac387+/CD16++, while others have larger numbers of resident pro-inflammatory macrophages characterized by CD68+/CD14++ or Mac387+/CD14++. Thus, patients with different types of chronic liver diseases have unique intrahepatic macrophage profiles and receptor expression that are used herein to predict their risk of later developing hepatic fibrosis and/or cirrhosis.

CD68 is a transmembrane glycoprotein that heavily glycosylated in its extracellular domain with a molecular weight of 110 kD, which is highly expressed by cells in the monocyte lineage (e.g., monocytic phagocytes, osteoclasts), by circulating macrophages, and by tissue macrophages (e.g., Kupffer cells, microglia). CD68 is also known as CD68 Molecule, CD68 Antigen, GP110, Macrosialin, Scavenger Receptor Class D, Member 1, SCARD1, and LAMP4, and the human CD68 has UniProt amino acid sequence: P34810; and nucleic acid sequence NM_001251 or NM 001040059.

Mac387 is a member of the S100 family of proteins containing 2 EF hand calcium-binding motifs and is localized in the cytoplasm and/or nucleus of a wide range of cells. Mac387 is involved in the regulation of a number of cellular processes such as cell cycle progression and differentiation. S100 genes include at least 13 members that are located as a cluster on chromosome 1921. Mac387 is also known as S100 Calcium Binding Protein A9, Migration Inhibitory Factor-Related Protein, Leukocyte L1 Complex Heavy Chain, Calprotectin L1H Subunit, Protein S100-A9, Calgranulin B, MRP-14, MRP14, CAGB, CFAG, and P14, and has UniProtKB: P06702; and is Entrez Gene: 6280.

CD163 is the high affinity scavenger receptor for the hemoglobin-haptoglobin complex, which belongs to the scavenger receptor cysteine rich family type B and consists of a 1048 amino acid residues extracellular domain, a single transmembrane segment and a cytoplasmic tail with several splice variants. CD163 is also known as Scavenger receptor cysteine-rich type 1 protein M130, M130, MM130, SCARI1, and human CD163 has the amino acid sequence of UniProt: Q86VB7, and nucleic acid sequence of RefSeq (mRNA): NM_004244, or NM_203416.

CD14 is a co-receptor (along with the Toll-like receptor TLR. 4 and MD-2) for the detection of bacterial lipopolysaccharide (LPS). CD14 exists in two forms, one anchored to the membrane by a glycosylphosphatidylinositol tail (mCD14), the other a soluble form (sCD14). Soluble CD14 appears after shedding of mCD14 (48 kDa) or is directly secreted from intracellular vesicles (56 kDa). CD14 is also known as Myeloid Cell-Specific Leucine-Rich Glycoprotein, and has the amino acid sequence of UniProt: P08571, and nucleic acid sequence of RefSeq (mRNA): NM_001174105, NM_000591, NM_001040021, or NM_001174104.

CD16 is a type III Fcγ receptor and in humans it exists in two different forms: FcγRIIIa (CD16a) and FcγRIIIb (CD16b), which have 96% sequence similarity in the extracellular immunoglobulin binding regions. CD16 is also known as Low Affinity Immunoglobulin Gamma Fc Region Receptor III-A, FCGR3, IGFR3, or FCG3, and has the amino acid sequence of UniProt: P08637, and nucleic acid sequence of Entrez Gene: 2214.

CCR2 is a receptor for monocyte chemoattractant protein-1, a chemokine which specifically mediates monocyte chemotaxis. Monocyte chemoattractant protein-1 is involved in monocyte infiltration in inflammatory diseases such as rheumatoid arthritis as well as in the inflammatory response against tumors. UniProtKB: P41597; nucleic acids sequence of RefSeq (mRNA): NM_001123041.2 NM_001123396.4

CCR5 belongs to the beta chemokine receptor family, which is predicted to be a seven transmembrane protein similar to G protein-coupled receptors. This protein is expressed by T cells and macrophages, and is known to be an important co-receptor for macrophage-tropic virus, including HIV, to enter host cells. UniProtKB: P51681; nucleic acids sequence of RefSeq (mRNA): NM_000579.3 NM_001100168.1.

Galectin3 is a carbohydrate binding protein, characterized by an N-terminal proline-rich tandem repeat domain and a single C-terminal carbohydrate recognition domain This protein plays a role in numerous cellular functions including apoptosis, innate immunity, cell adhesion and T-cell regulation. UniProtKB: P17931; nucleic acids sequence of RefSeq (mRNA): NM_001177388.1 NM_001357678.2 NM_002306.4.

FXR functions as a receptor for bile acids, and when bound to bile acids, binds to DNA and regulates the expression of genes involved in bile acid synthesis and transport. UniProtKB: Q96RI1; nucleic acids sequence of RefSeq (mRNA): NM_001206977.2 NM_001206978.2 NM_001206979.2 NM_001206992.2 NM_001206993.2.

The current invention demonstrates systems and methods to identify and assess patients with liver disease, including but not limited to NAFLD, HCV, and AIH, and their risk for later development of fibrosis and/or cirrhosis. Due to the limited tissue obtained from a liver biopsy, flow cytometry is challenging and destroys hepatic architecture, illustrating the need for a better more effective method of analysis. A recently developed technique allows for in situ characterization of human cells in formalin-fixed paraffin-embedded tissues (FFPE) allowing spectral unmixing, eliminating spectral overlap, and subtraction of background auto-fluorescence (present in liver tissue). The current invention utilizes a 2, 3, 4, 5, or 6-color multiplex protein immunohistochemical (IHC) biomarker panel and cutting-edge spectral imaging microscopy to analyze variations in human macrophage profiles within intact liver tissue collected from patients with different types of chronic liver disease to identify macrophage populations to assess, determine, and stratify risks of development of fibrosis and/or cirrhosis and provide personalized treatment options for the patient based on the macrophage population profile.

FIG. 1 illustrates that macrophage heterogeneity influences the hepatic microenvironment and stellate cell activation. Along with liver sinusoidal endothelial cells, Kupffer cells are constantly exposed to antigens from the gastrointestinal tract and are relatively tolerogenic. Once activated, these cells secrete pro-inflammatory cytokines and chemokines that recruit monocyte-derived macrophages, which are proposed to be the main cell type that activates stellate cells/myofibroblasts to promote fibrosis development. Patients with different types of chronic liver diseases have unique intrahepatic macrophage profiles and receptor expression. In one embodiment of the current invention the unique intrahepatic macrophage profiles and receptor expression are utilized to predict the risk of later development of hepatic fibrosis and/or cirrhosis. In a further embodiment of the current invention, the unique intrahepatic macrophage profiles and receptor expression are utilized for personalized medicine treatment options and development.

FIG. 2 illustrates the antibodies and markers used in embodiments of the current invention, including but not limited to, CD68 (predominantly a Kupffer cell marker), Mac387 (predominantly a systemic monocyte-derived macrophage marker) and CD163 (established "M2" or pro-fibrogenic macrophage marker). In addition to the specific macrophage marker analysis, additional embodiments of the current invention also evaluate expression levels of CD14 and CD16 on these cells through multiple ratio analyses. In another embodiment of the current invention, the above stated antibodies and markers are used in conjunction with one another for the assessment of liver disease. In a further embodiment of the current invention, the noted antibodies and markers are utilized in conjunction with other known antibodies and markers, including but not limited to macrophage specific antibodies and markers, for the assessment of liver disease and/or related health issues.

TABLE 1

| Pro-inflammatory Panel | |
|---|---|
| CD14+ | Pro-Inflammatory/LPS Co-Receptor |
| MAC387 (S100A9) | Pro-Inflammatory protein |
| IL-1β/TNFa | Pro-Inflammatory Cytokine |
| CCL2 (MCP-1) | Pro-Inflammatory Chemokine |
| TIMP1 | Pro-fibrotic protein/Metalloproteinase Inhibitor |
| NFkβ/P65 | Pro-Inflammatory/Transcription Factor |
| DAPI | Nuclear CounterStain |
| Anti-Inflammatory/Restorative Panel | |
| CD163 | M2 Macrophage/Hemoglobin Scavenger Receptor |
| CD206 | M2 Macrophage/Mannose Receptor |
| CD16 | Anti-Inflammatory/FC gamma Receptor |
| TGF-β/IL-10 | Anti-Inflammatory/Profibrotic Cytokine |
| MMP 1 | Anti-Fibrotic protein/Matrix Metalloproteinase |
| DAPI | Nuclear CounterStain |
| Fibrotic Multiplex panel | |
| CD163 | M2 Macrophage/Hemoglobin Scavenger Receptor |
| CD14 | Pro-Inflammatory/LPS Co-Receptor |
| Cytoglobin | Activated HSCs |
| Alpha-SMA | Activated HSCs and myofibroblasts |
| CD36 | LSECs, primarily in zone 1 |
| LYVE-1 | LSECs, primarily in zones 2 and 3 |
| Anti-Fibrotic therapy targets Multiplex panel | |
| MAC387 (S100A9) | Pro-inflammatory protein |
| CCR2 | Pro-Inflammatory chemokine, Receptor for CCL2 |
| CCR5 | Pro-inflammatory chemokine, Receptor for CCL5 |
| Galectin3/GALS3 | Receptor on HSCs and Kupffer cells |
| FXR | Farnesoid X receptor |
| Cytoglobin | Activated HSCs |

Figure 3:
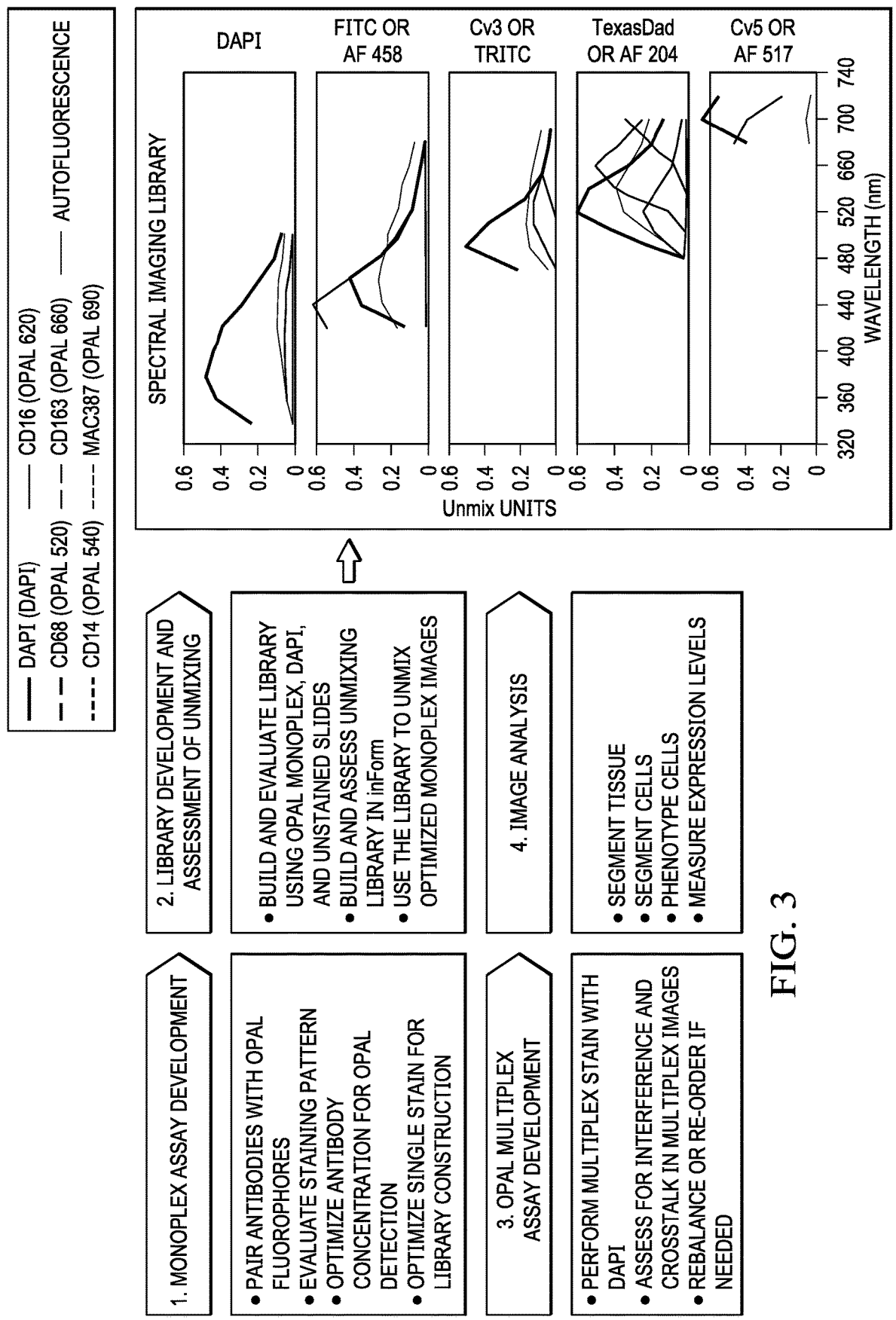
FIG. 3 is a development and optimization work flow diagram according to embodiments of the current invention.

FIG. 3 is the process flow diagram used in the development and optimization of the multiplex screening assay. The initial step in the process is the development and optimization of each monoplex assay. Each of the monoplex assays requires the pairing of target specific antibodies with OPAL™ fluorophores (Akoya, USA), ensuring minimized spectral overlap. Each specific IHC monoplex assay is evaluated for individual staining patterns by optimizing antibody concentration for OPAL™ detection and library construction. The second step of the process is library development and assessment of unmixing. This process requires building and evaluation of the library using OPAL™ monoplex, DAPI, and unstained slides followed by building and assessment of the unmixing library in the spectral analysis software. These two libraries are then used to unmix optimized monoplex images. The third step in the process is the development of the OPAL™ multiplex assay. This step requires running the multiplex stain with DAPI followed by assessment for interference and crosstalk in multiplex images. Once the assessment is complete, rebalance and re-order are performed as needed. The fourth and last step of the process is image analysis. This phase requires tissue segmentation, cell segmentation, cell phenotyping, and quantification and measurements of expression levels.

Figure 4:
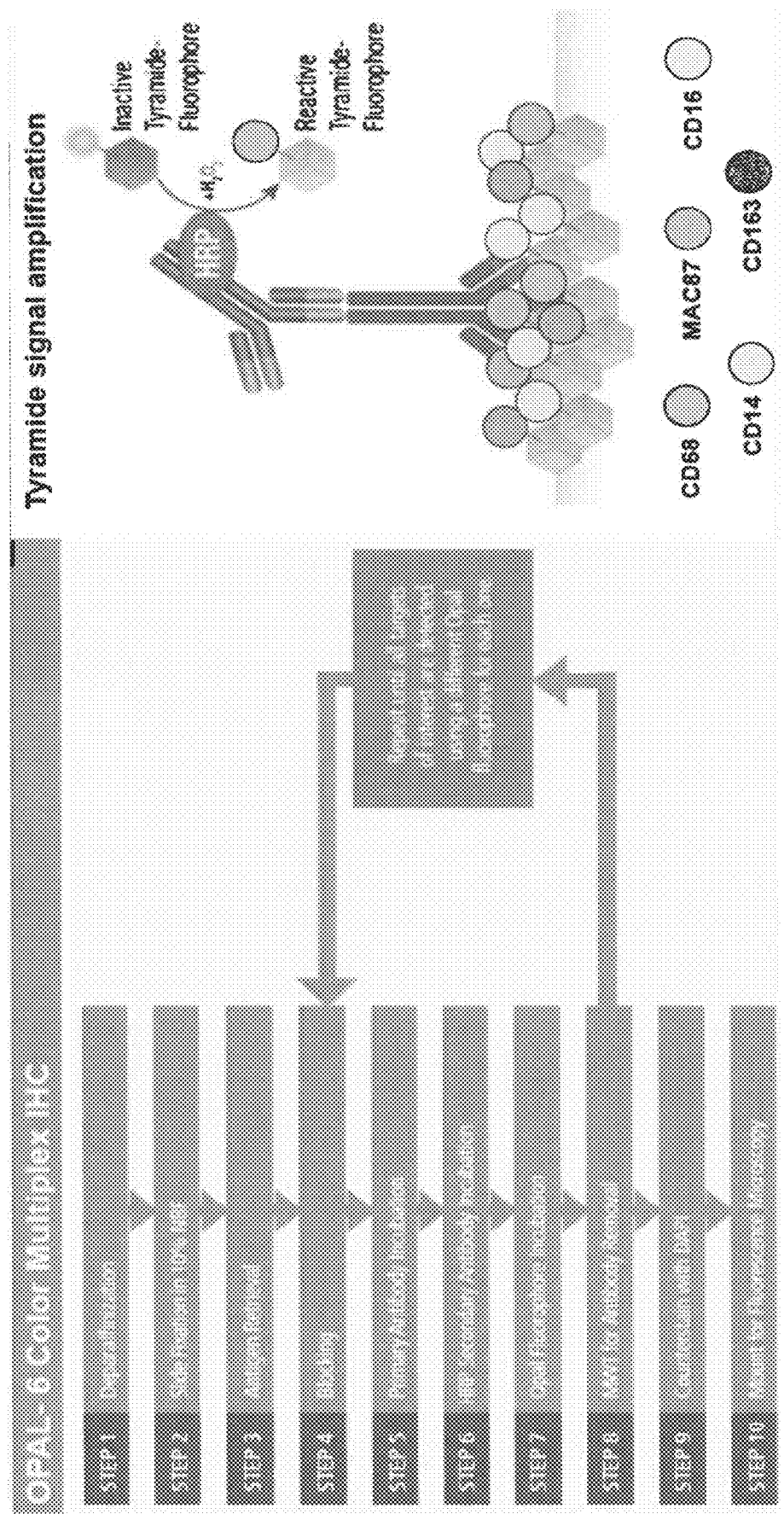
FIG. 4 is a workflow diagram for the multiplex assay and utilization of TSA according to embodiments of the current invention.

In one embodiment of the current invention illustrated in FIG. 4, tyramide signal amplification (TSA) is utilized to stabilize and enhance fluorescence signals. TSA also removes the primary and secondary antibodies with each antigen retrieval step, which allowed multiple antibodies from the same species to be used. In a further embodiment of the current invention, the Vectra 3 microscope acquires ROIs from 50% of the tissue in each core liver biopsy, which results in 25-30 multispectral images per patient. The multiple region-of-interest (ROI) images from each patient's liver biopsy are then analyzed in batches with inForm and Visiopharm software programs. After spectral unmixing, the cell and tissue segmentation features of the inForm digital imaging analysis software were used, which allows phenotyping and quantification of various macrophage phenotypes in both the portal tracts and lobules. In a further embodiment of the current invention, inForm and Visiopharm software are used to generate phenotype matrices and t-SNE plots, which allow for easy recognition of unique patterns in the macrophage phenotypes.

FIG. 4 illustrates further embodiments of the current invention with respect to the multiplex assay development and optimization. During the OPAL™ 6 color multiplex IHC assay development and optimization, each tissue sample is deparaffinated followed by slide fixation in 10% NBF. After fixation, antigens are retrieved followed by blocking, primary antibody incubation, HRP secondary antibody incubation, OPAL fluoraphore incubation, and MWT for antibody removal. These steps are repeated until all targets of interest are detected using different fluoraphores for each one. All samples are then counterstained with DAPI followed by mounting for fluorescence microscopy analysis.

Figure 5:
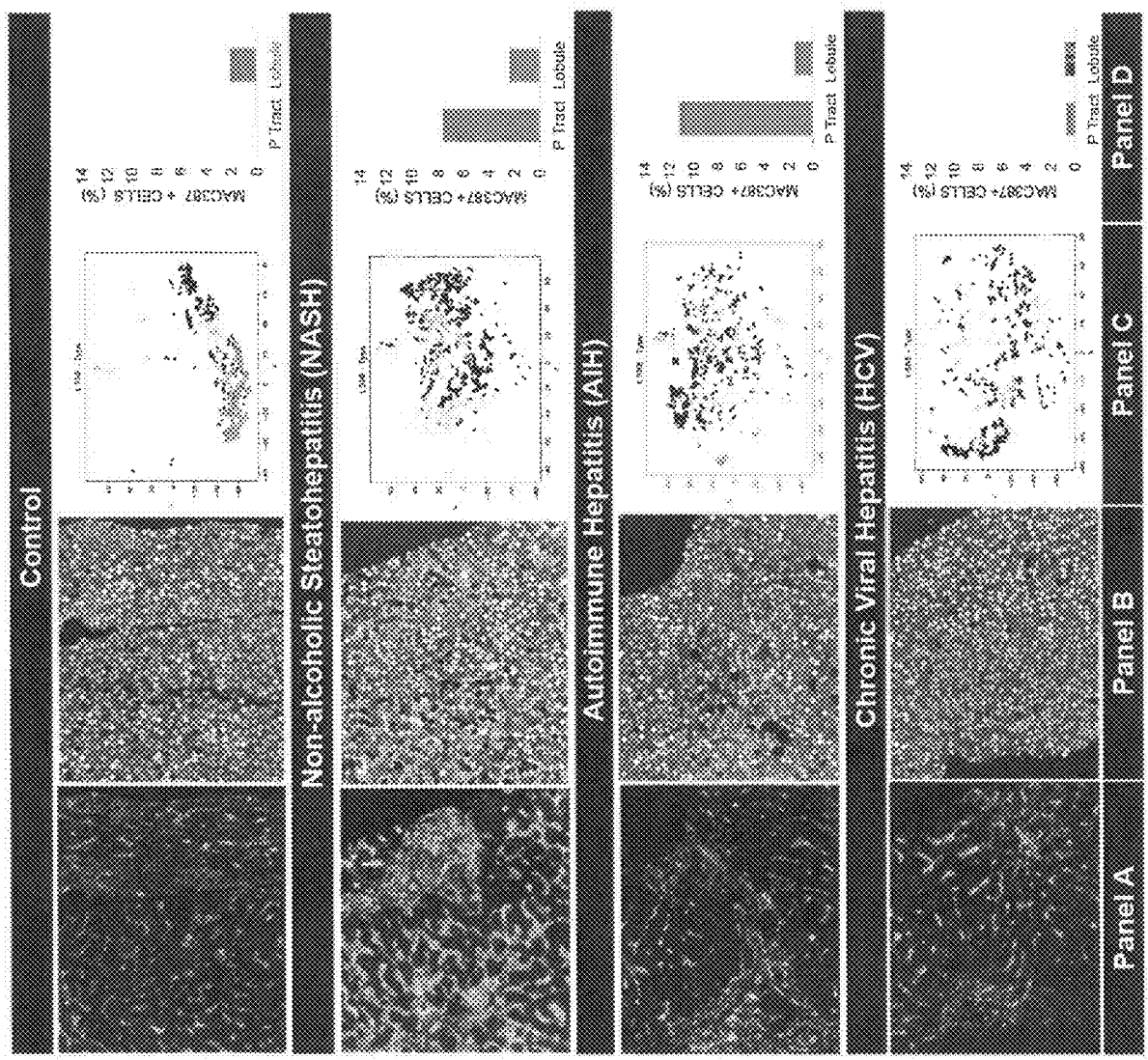
FIG. 5, Panels A to D show examples of multiplex images obtained from liver biopsies in patients with chronic liver diseases (NASH, AIH and HCV) according to embodiments of the current invention.

FIG. 5, Panels A to D, illustrate multiplex images obtained from liver biopsies in patients with chronic liver diseases (NASH, AIH and HCV) and show unique patterns when compared to each other and controls. Biopsies are stained with the macrophage multiplex panel (CD68, CD163, Mac387, CD14, CD16, and DAPI) and representative images (20×) are acquired. The present invention may also use a first panel of CD68, CD163, Mac387, and DAPI, subsequently supplemented with CD14 and/or CD16. FIG. 5, Panel A illustrates fluorescent multispectral images obtained after staining with the multiplex panel. FIG. 5, Panel B illustrates the images analyzed with Visiopharm applications and each color/shade variation represents a cell with a unique cellular phenotype. Each disease shows a unique pattern. FIG. 5, Panel C illustrates t-SNE plots using dimensional reduction to facilitate visualization of macrophage marker expression. Cells with similar properties appear close together in a two-dimensional map and hot markers show cells with relatively more expression of that specific marker when compared to cold markers, which indicate absent or minimal expression. t-SNE plots highlight the unique profiles of macrophages in the livers of patients with chronic liver diseases versus controls. FIGURE S, Panel D illustrates differences in the numbers of Mac387+ (or monocyte-derived) macrophages in the portal tracts and lobules in NASH, AIH or HCV, compared to controls. Results shown are representative of three different patients with similar hepatitis activity scores (i.e., MHAI) and fibrosis stages.

Figure 6:
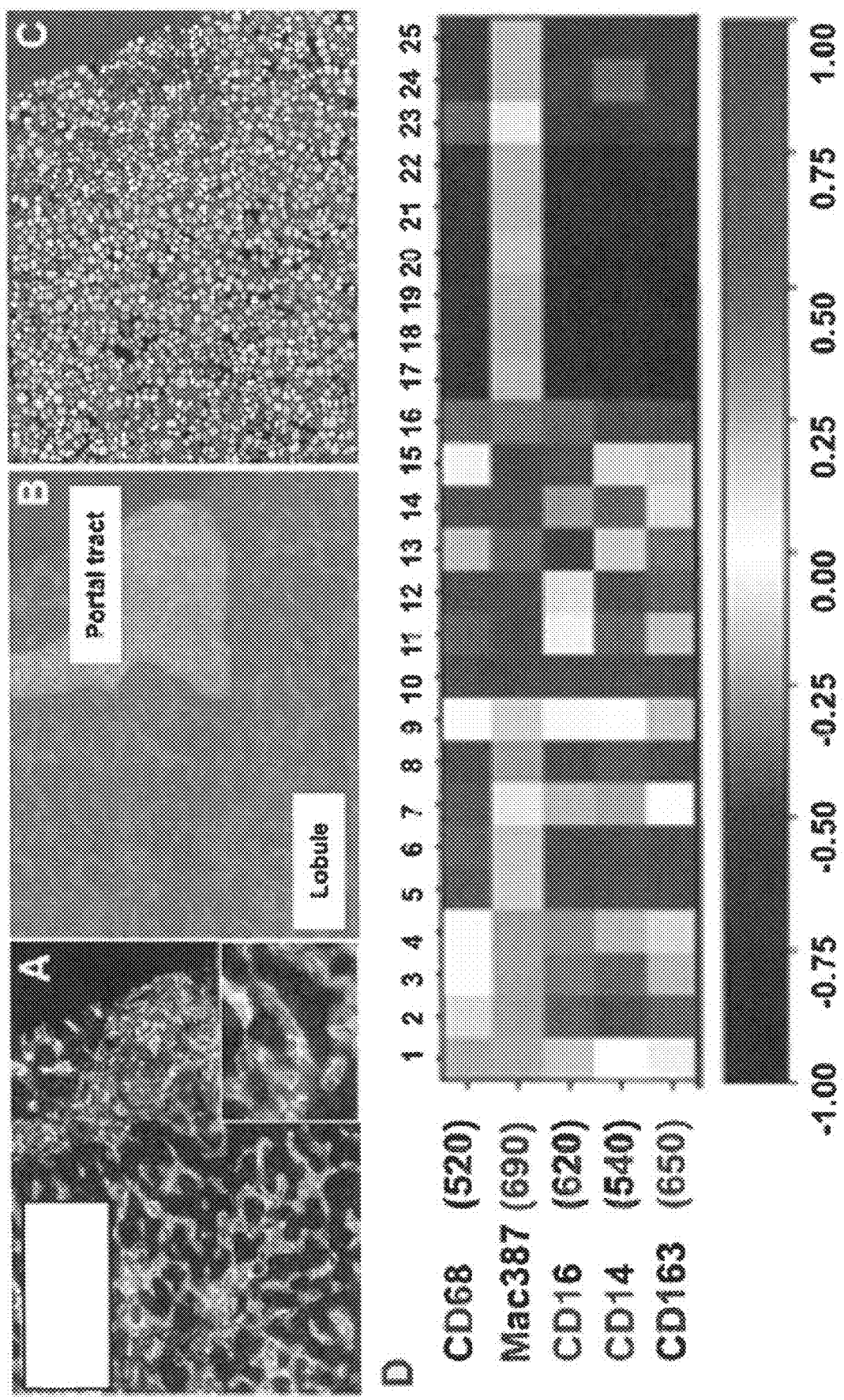
FIGS. 6A to 6D illustrate additional images from the patient with active NASH.

FIGS. 6A to 6D illustrate additional images from the patient with active NASH. FIG. 6A illustrates a florescent multiplex image. FIG. 6B illustrates the tissue segmentation feature of the software, which allows quantification of the different macrophage phenotypes (FIG. 6C) in both portal tracts and lobules. FIG. 6D illustrates the Visiopharm phenotypic matrix algorithm identifying 16 distinct macrophage phenotypes in one multiplex image obtained from a patient with NASH.

Figure 7:
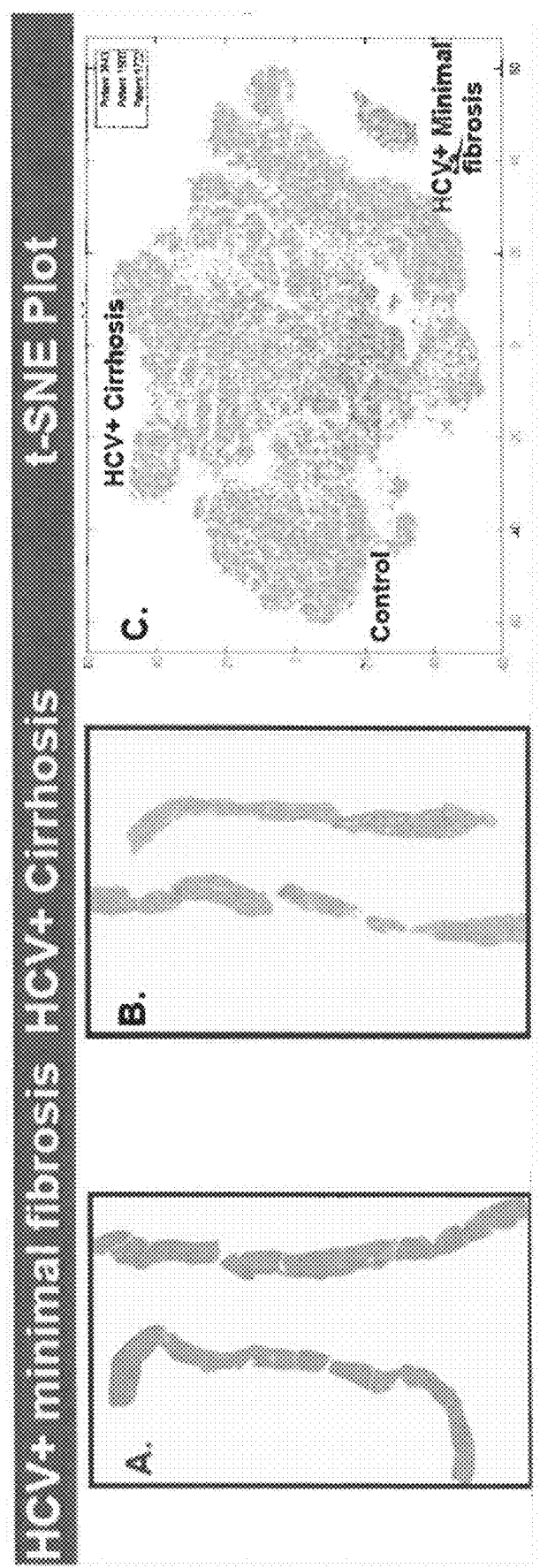
FIGS. 7A to 7C illustrate liver biopsies from two separate HCV genotype 1a+ patients that were both diagnosed with the virus over 20 years ago.

FIGS. 7A to 7C illustrate liver biopsies from two separate HCV genotype 1a+ patients that were both diagnosed with the virus over 20 years ago. FIG. 7A illustrates a liver biopsy showing minimal fibrosis. Only the portal tracts are staining due to normal fibrous septa; this is similar to the pattern observed in controls. FIG. 7B illustrates a cirrhosis patient with bands of bridging fibrosis and large areas of parenchymal extinction. FIG. 7C illustrates t-SNE analysis of all markers in patients FIG. 7A and FIG. 7B versus controls demonstrating the 6-color multiplex panel is able to identify unique profiles in these different patients.

In certain embodiments of the current invention, Artificial Intelligence (AI) and/or Machine Learning (ML) is employed to automatically assess, analyze, and/or detect specific disease state macrophage phenotype patterns of a patient sample against those of a standard or control sample. AI can be thought of as an umbrella term that covers any mechanism producing the appearance of intelligence in a machine. This encompasses a spectrum from narrow-application, rules-based programs all the way to the state-of-the-art self-learning Convolutional Neural Nets. ML is a type of AI. ML can best be thought of as a "model" that is given a large amount of input data, the desired output, and then told to invent the rules that will allow it to accurately get there. There are "algorithms" that "learn" to "optimize' a certain function, effectively reducing the "loss", or measured error, between a desired output and the model's output. The ML goes through multiple iterations of its rules, attempting to reach a minimized error. Deep Learning (DL) is a type of ML that uses multiple "hidden layers" of objects called neural networks. These networks include "nodes", which are a computational abstraction where a specific function is performed. A node is analogous to a small brain that looks at one small aspect of the overall algorithm, such as a Deep Learning node that looks for the 8-sided shape of a stop sign. These nodes are dynamically "weighted" during the minimization process to control their influence on the overall algorithm. Through a process called "back-propagation", the influence of the weights propagates through the network due to its interconnectedness. The upshot of this process is that the programmer defines the input network and the desired output type and the model refines the "hidden" intermediate layers.

Based on the embodiments enumerated in the current invention, spectral imaging microscopy represents a powerful technique that enables quantification and identification of distinct intrahepatic macrophage phenotypes in situ in human FFPE liver tissue. The multiplex staining panel and imaging analysis software algorithms allows these elusive cells to be studied in the context of intact hepatic architecture, overcoming significant limitations with other techniques such as flow cytometry. The macrophage profiles, correlated to patient outcomes, will prove to be a important and powerful tool for researchers and clinicians in assessing, diagnosing, and treating advancing liver diseases.

Example 1. Evaluate Differences in Hepatic Macrophage Profiles in Patients with Non-Alcoholic Fatty Liver (NAFL) Compared to Patients with NASH and Determine the Profile that is Associated with Development of Fibrosis The present inventors used archived liver biopsies from patients that have hepatic steatosis without any evidence of active steatohepatitis or fibrosis (n=20), and another group that have active steatohepatitis (n=20); both groups have minimal fibrosis. Also, blocks from patients that previously had two or more biopsies for NASH fibrosis staging were obtained; some showed no increased fibrosis (n=44) in their second biopsy, while other progressed to cirrhosis (n=44). A multiplex panel is used to compare the differences in these patients' hepatic macrophage profiles. These patients are age, sex, ethnicity, and BMI matched, all have reported minimal alcohol use, and all are negative for the main hepatotropic viruses.

NAFLD causes cirrhosis, liver transplantation, and HCC in the United States and its incidence is increasing. Understanding the variations and similarities of intrahepatic macrophages in patients with NAFL/NASH enables a better understanding of the pathophysiology of the disease and for developing targeted therapies.

Patient Population. The inventors searched the pathology databases at our institution between the years 2005 and 2010 and identified 284 patients that had a liver biopsy collected for confirmation of NAFL or NASH. Of these, 62% (n=176/284) had adequate follow-up, and 25.0% (n=44/284) developed cirrhosis (as determined by repeat liver biopsy or requirement for liver replacement). For the first part of this example, 20 patients who had biopsy-proven NAFL are compared to 20 patients that had NASH. All of these patients had minimal/mild fibrosis at the time of biopsy (NAFLD fibrosis stage: 0-¼). For the second part of this example, the biopsies from patients are analyzed that have two or more biopsies collected or underwent liver transplantation to determine if the macrophage profile identified in their initial biopsy could have predicted their future development of fibrosis. As mentioned above, the majority of patients with adequate follow-up showed minimally increased fibrosis over time (132/176:75.0%) and a portion developed cirrhosis (44/176:25.0%). Forty-four liver biopsies from each group will be analyzed with our platform and will allow us to determine if a patient's hepatic macrophage profile at the time of their first biopsy could have predicted clinical outcome. Each patient's liver biopsy will be stained with our 6-color macrophage multiplex panel, followed by spectral imaging analysis. Twenty control liver biopsy tissue blocks from patients without known liver disease, normal hepatic enzyme levels, and whose liver biopsies showed minimal histopathologic changes will be used as controls. Relevant demographic and clinical information from the medical record including: total Bilirubin, AST, ALT, HIV status, alcohol use, platelet counts, albumin level, HbA1C, lipid levels, and prothrombin time are also acquired. This population, including study patients and controls, has a mean age of 50.10 (median: 51.2) and is 58.0% male, 42.0% female, 40.0% white, 33.0% black, and 27.0% Hispanic. Since NASH in pediatric patients has a different histologic pattern (e.g., of steatosis, etc.), these patients will be excluded. Because pregnancy and breastfeeding can alter immune profiles and also preclude liver biopsies, however, pregnant women are excluded. Only patients in which alcohol use is adequately recorded in the medical record will be included. The patients selected for each group will be age-, sex-, and ethnicity-matched and must have labs confirming they are negative for infection with the common hepatotropic viruses (at least HBV and HCV).

The results of example 1 will illustrate differences in the intrahepatic macrophage profile in patients with NAFL versus NASH and will also determine if these differences are able to predict the risk of later developing bridging fibrosis or cirrhosis. Our preliminary data shows that this multiplex panel adequately identifies unique macrophage populations in patients with NASL/NASH and showed increased monocyte-derived macrophages in the portal tracts. These differences are also seen prior to the development of disease, thus identifying key macrophage phenotypes that are present in a relatively tolerant human liver versus one that is relatively pro-inflammatory/pro-fibrotic in patients with NAFLD.

Example 2. Determine if an HCV+ Patient's Hepatic Macrophage Profile Predicts Future Development of Cirrhosis The next goal is to compare hepatic macrophage phenotypes in two different populations of HCV+ patients—those that did not develop hepatic fibrosis and those that developed cirrhosis. The inventors selected well-matched patients from each group that met inclusion criteria and had adequate liver biopsies according to AASLD standards. These archived liver biopsies were obtained from HCV+ patients (genotype 1) that have had two or more liver biopsies separated by at least 5 years. Group 1 is a control group who developed minimal to mild fibrosis over time (n=34) and group 2 is a patient group who developed advanced fibrosis/cirrhosis (Ishak fibrosis stage 5 or 6) over time (n=34). The multiplex panel of the present invention is used to determine if a patient's hepatic macrophage profile at the time of their first biopsy could have predicted the severity of fibrosis determined by their second liver biopsy. These patients are age, sex, ethnicity, and BMI matched, all have reported minimal alcohol use, and all are HCV treatment-naïve.

Despite the availability of DAA treatment, HCV remains an important disease. The CDC estimates that the incidence of HCV infection is on the rise due to the opioid epidemic, is increasing in young people (ages 18-39), and will go largely unnoticed in the absence of comprehensive screening. In addition, most studies of intrahepatic macrophages in chronic HCV infection have been conducted using in vitro models or other systems that do not mimic the long-term chronic infections seen in humans.

Patient Population: The inventors searched the pathology databases at our institution between the years 2004 and 2014 and identified 152 HCV genotype 1+ patients who have had two liver biopsies conducted, at least 5 years apart. Our HCV+ patient group (n=34:22.4%) showed a marked increase in hepatic fibrosis between their first and second biopsies (i.e., developed incomplete or complete cirrhosis; Ishak stages 5 or 6 out of 6). Our HCV+ control group (n=118:77.6%) showed no or only minimally increased fibrosis (i.e., ≤1 stage change out of a maximum of 6). This population, including HCV+ study patients and HCV+ controls, has a mean age of 52.45 (median: 51.5) and is 72.0% male, 28.0% female, 35.0% white, 43.0% black, and 22.0% Hispanic. All ages will be included in the study. Because pregnancy and breastfeeding can alter immune profiles and also preclude liver biopsies, however, pregnant women are excluded. Detectable HCV RNA can be used to confirm HCV infection. Next, 34 patient liver biopsies from each group are stained with the 6-color macrophage multiplex panel, followed by spectral imaging analysis, to determine if a patient's hepatic macrophage profile at the time of their first biopsy could have predicted the outcome observed in their second liver biopsy. A selected number of well-matched (i.e., age-, sex- and ethnicity-matched) patients from each group (n=34 per group) are analyzed and compared a control group that does not have known liver disease, is negative for hepatotropic viruses, and has normal hepatic enzyme levels (same control group as Example 1, n=20). It is also possible to acquire relevant demographic and clinical information from the medical record including: HCV genotype, viral load, total Bilirubin, AST, ALT, HIV status, alcohol use, platelet counts, albumin level, and prothrombin time. None of the patients in this example has been treated with DAA therapy for HCV and all are HCV treatment naïve according to AASLD-IDSA guidelines.

The results of Example 2 show whether an HCV+ patient's intrahepatic macrophage profile can predict the risk of them later developing bridging fibrosis or cirrhosis. This study allows for the identification of the key macrophage phenotypes that are present in a relatively tolerant human liver versus one that is relatively pro-inflammatory/pro-fibrotic. The liver biopsies collected from patients that eventually developed cirrhosis had increased pathogenic proinflammatory intrahepatic macrophages present prior to the development of liver injury and fibrosis. The macrophages in these patients will be there early in the disease process, in increased numbers and more activated (as determined by increased CD14 expression), which will enhance inflammation-induced injury and lead to rapid development of hepatic fibrosis (or improper "wound healing") when compared to the control group.

Example 3. Define Variations in Intrahepatic Macrophage Profiles in Patients with Chronic Active AIH that Responded to Treatment Compared to Those that were Refractory to Treatment and Developed Hepatic Fibrosis/Cirrhosis A review by the present inventors of archived liver biopsies from patients with AIH identified two distinctive groups. The control group had chronic active AIH with minimal hepatic fibrosis (n=16); the second group had active chronic AIH and progressed to cirrhosis (n=16) (as determined by repeat biopsy or need for liver transplantation). The multiplex panel of the present invention is used to compare the differences in these patients' hepatic macrophage profiles. These patients are age, sex, and ethnicity-matched, all have reported minimal alcohol use, and all are negative for the main hepatotropic viruses. Only cases in which a diagnosis of AIH was considered "definite" by use of the simplified criteria will be analyzed in this example.

There are very few published reports studying intrahepatic macrophages in AIH when compared to other chronic liver diseases. This example compares patients with contrasting clinical outcomes to determine if variation in their intrahepatic macrophages differed. The AIH+ patient group includes those patients whose disease was amenable to treatment; the AIH+ control group includes those that had relatively mild, treatable disease.

Patient population: The inventors identified 89 patients that had liver biopsies obtained between 2004-2014 that had confirmed biopsy-proven AIH according to the simplified criteria for "definite" diagnosis (i.e., a score of 7 or higher), and had adequate follow-up. Of these, 16 developed cirrhosis or required liver replacement. The control AIH+ group that will be used for comparison was considered successfully treated according to AASLD guidelines. This population has a mean age of 47 (median: 49) is 32.0% male, 68.0% female, 62.0% white, 17.0% Black, and 21.0% Hispanic. The same inclusion and exclusion criteria are used as those defined in Example 1. Relevant demographic and clinical inf: phase II completed, moving to phase IIIormation from the medical record including: serum markers of AIH (e.g., ANA, F-actin antibodies, IgG immunoglobulins), hepatotropic virus status (must be seronegative for at least HAV, HBV, and HCV), HIV status, total Bilirubin, AST, ALT, alcohol use, platelet counts, albumin level, prothrombin time, and alpha-fetoprotein (AFP) levels are also obtained. All biopsies from the AIH+ study patient group (n=16) and 16, age-, sex-, and ethnicity matched biopsies are analyzed and compared to the AIH+ control group. Another board-certified pathologist that is not involved in this study confirms the histopathologic scoring for AIH, MHAI, and cirrhosis, etc. in a blinded fashion. The control group (20 AIH negative patients without known liver disease) in this example is slightly modified when compared to that used in Examples 1 and 2 because this patient cohort includes more females (68%), as expected.

The macrophage profile in AIH+ patients is compared to that are the most and least susceptible to developing hepatic fibrosis/cirrhosis. The liver biopsies from the patients that later developed fibrosis will have larger numbers of pro-inflammatory/pro-fibrotic macrophages. These will be characterized by increased numbers of parent macrophages (i.e., CD68+, CD163+, and Mac387+) that express pro-inflammatory and profibrotic markers (i.e., increased CD163 and CD16 or "M2" markers). The panel is able to identify unique macrophage profiles in patients with chronic active AIH and different fibrosis stages and to show unique patterns in patients with mild versus refractory AIH.

reporter probe counts are tabulated in a comma separated value (CSV) format for convenient data analysis. The result is very precise and accurate measurements of gene expression, enabling you to gather data on your targets of interest rapidly with minimal intervention. NanoString technology utilizes target-specific reporter and capture probes that directly hybridize to a target of interest. Each probe pair has a color-coded reporter and a capture probe with target-specific sequences covalently attached. During an overnight hybridization, the specific Reporter and Capture Probes hybridize directly to the single-stranded RNA or DNA target molecule in solution.

A portion of the liver biopsy will be utilized to compare differences in gene expression profiles between patient group and different disease types. The spectral imaging and gene expression workflow is outlined below.

This combinational use of spectral imaging and gene expression analysis will be used to develop precision/personalized therapeutic approaches for patients prior to development of cirrhosis and hepatocellular carcinoma. The table below outlines a plurality of antifibrotic therapies, with the mechanism of action, that can be candidates for use in patient treatment.

TABLE 2

Anti-fibrotic Therapies for patients with non-alcoholic steatohepatitis.

| Drug | Target molecule | Mechanism of action in liver | Clinical trial (https://Clinicaltrials.gov) |
| --- | --- | --- | --- |
| Cenicriviroc (CVC) | CCR2/CCR5 | Dual CCR2/CCR5 antagonist; on monocytes, Kupffer cells and HSCs inhibits systemic Mac infiltration | AURORA (NCT03028740): Recruiting for phase III and undergoing accelerated approval by FDA based on biopsy-proven reduction in fibrosis |
| Galactoarabino-rhamnogalaturonan (GR-MD-02) | Galectin 3 | Galectin 3 antagonist; inhibits HSC and Kupffer cell activation | GR-MD-02 (NCT02421094): phase II completed, moving to phase III |
| Obeticholic acid (OCA) | Farnesoid X receptor (FXR)/NR1H4 | FXR agonist; on Macs and HSCs, expressed in the liver and gut | REGENERATE (NCT02548351): active phase III |

Example 4: Method of Using Spectral Imaging Phenotyping, Gene Expression Analysis (NanoString—www.nanostring.com), and Artificial Intelligence (AI)/Machine Learning (ML) for Liver Microenvironment Evaluation and Precision Medicine Determination In combination with the described spectral imaging component of the present invention. The use of gene expression technology such as NanoString can be used to enhance the evaluation of the liver microenvironment. NanoString technology is based on digital detection and direct molecular barcoding of individual target molecules using a unique probe pair for each target of interest. Digital images are processed within the NanoString instrument, and the The majority of patients with chronic liver disease (e.g., NASH, AALD, CHC, and AIH) do not develop cirrhosis or end-stage liver disease. Differences in the hepatic microenvironment, including the expression of Mac, LSEC, and HSC-related pro-inflammatory and pro-fibrotic signals, determine how a patient responds to liver injury. Preliminary data shows that some patients have more tolerogenic hepatic microenvironments while others have more pro-inflammatory/pro-fibrotic signals, even when these patients have minimal hepatic fibrosis. In this manner, differences in gene expression profiles early in the disease course that can predict risk of fibrosis progression-including evidence for differences in therapy-related targets, are determined.

NanoString analyzes will be performed on remaining liver biopsy materials to compare differences in the Mac, LSEC, and HSC-related and profibrotic gene profiles between the two groups (Group NP and Group RP). Gene expression profiles generated from each group will be used to develop risk prediction models to determine if features in the initial liver biopsy presages enhanced fibrosis progression.

Table 3 shows the results of RNA from unstained FFPE slides (3 micron) for use with Nanostring. Briefly, three slides from each liver biopsy were used for RNA extraction. Concentrations were measured with Qubit and quality control was performed on a bioanalyzer using RNA6000 pico assay.

TABLE 3

RNA from unstained FFPE slides (3 micron) for use with Nanostring.

| Pt | slide type | DV200 | Conc (ug/μl) | Total Yield (ug) | Final RNA (ug) |
|----|------------|-------|--------------|------------------|----------------|
| 1  | fresh FFPE | 84    | 10.3         | 133.90           | 82.40          |
| 2  | fresh FFPE | 56    | 10.4         | 135.20           | 83.20          |
| 3  | fresh FFPE | 89    | 23           | 299.00           | 184.00         |
| 4  | fresh FFPE | 65    | 22.3         | 289.90           | 178.40         |
| 5  | fresh FFPE | 75    | 20.7         | 269.10           | 165.60         |
| 6  | fresh FFPE | 72    | 11           | 143.00           | 88.00          |
| 7  | fresh FFPE | 35    | 19.3         | 250.90           | 154.40         |
| 8  | fresh FFPE | 83    | 19.3         | 250.90           | 154.40         |
| 9  | fresh FFPE | 63    | 16.2         | 210.60           | 129.60         |
| 10 | fresh FFPE | 43    | 17.8         | 231.40           | 142.40         |
| 11 | fresh FFPE | 85    | 32.8         | 426.40           | 196.80         |
| 12 | fresh FFPE | 67    | 52           | 676.00           | 208.00         |
| 13 | fresh FFPE | 82    | 15.5         | 201.50           | 124.00         |
| 14 | fresh FFPE | 73    | 30.3         | 393.90           | 181.80         |
| 15 | fresh FFPE | 75    | 32.9         | 427.70           | 197.40         |
| 16 | fresh FFPE | 89    | 37.3         | 484.90           | 205.15         |
| 17 | fresh FFPE | 88    | 33           | 429.00           | 198.00         |
| 18 | fresh FFPE | 68    | 32.5         | 422.50           | 195.00         |
| 19 | fresh FFPE | 96    | 25.8         | 335.40           | 180.60         |
| 20 | fresh FFPE | 56    | 11.8         | 153.40           | 94.40          |
| 21 | fresh FFPE | 68    | 30           | 390.00           | 180.00         |
| 22 | fresh FFPE | 87    | 22.1         | 287.30           | 176.80         |
| 23 | fresh FFPE | 61    | 36           | 468.00           | 216.00         |
| 24 | fresh FFPE | 38    | 8.37         | 108.81           | 66.96          |

NanoString analysis (MDACC). RNA will be extracted using High Pure FFPET RNA Isolation kit from Roche. RNA cleaning will be performed using RNA Clean & Concentrator kit from Zymo Research. RNA expression profiling will be analyzed using a custom designed immune profiling panel and the nCounter Sprint profiler. Our preliminary study showed that concentrations of 46. lng to 150. lng were adequate for hybridization. Raw data will be received in RCC files and data analysis will be performed using nSolver software's Advanced Analysis Module, which will allow us to obtain normalized, log 2 transformed data for each gene in each sample and compare it to the differential expression gene list. This module allows cell types and pathway signature scores between the Group NP, Group RP, and control groups, as well as by disease specific etiology. Ingenuity pathway analysis is built into the platform, thus, allowing a comparison of pathway signature scores between all groups similar to the preliminary analysis below. Preliminary NanoString results showed that this platform is able to identify significant increases in potential therapeutic targets (e.g., CCL2, CCR2, and CCL5) in patients with advanced fibrosis. It is these targets that are identified in the RP group of patients at the of diagnosis in their initial liver biopsies.

Statistics (UTMB). When the sample size is 150 for the minimal fibrosis group (Group NP) and 75 for the study group (Group RP), a student's t-test ($\alpha=0.05$ two-sided) will have 80% power to detect significant differences with an expected effect size of 0.397 using the pwr.t2n.test function of the pwr package within R. When the total sample size is 225, the logistic regression test of $\beta=0$ ($\alpha=0.05$ two-sided) will have 80% power to detect an odds ratio of 1.5; this assumes only one normally distributed covariate x in the model, and that the prevalence of advanced fibrosis is 0.335. A combination of logistic regression and machine learning techniques is used to create a predictive model which will be able to distinguish the Group RP individuals from the Group NP individuals. Using cellular phenotypes, demographic data (if additional variables are needed), a feature reduction techniques including SAM and principal component analysis is used first to determine an initial pool of predictor variables. The use of variables that exhibit multi-collinearity in the same model will generally be avoided. This encompasses the data pre-processing and variable selection step. From there, Random Forests classification and regression trees was used. Multivariate adaptive regression splines and logistic regression can also be used to create various models using fibrosis category membership as our outcome variable. Since machine learning algorithms have a tendency to overfit training data, the data is split into 80% training data, 20% testing data, a 10-fold cross-validation. The set with the highest prediction accuracy and area under the receiver operating characteristic curve for both training and testing data is validated. This model can be used to predict whether a person at initial presentation will become a member of the advanced fibrosis group (Group RP) over time. In summary, this approach allows the use of the exact same techniques and parameters to analyze each study group (NP and RP) patient's liver biopsy, allowing direct comparison of Mac-LSEC-HSC-related pro-inflammatory, pro-fibrotic and other genes between these different groups of well-matched patients that are most and least susceptible to development of hepatic fibrosis.

TABLE 4

NanoString showed significantly different gene expression in the positive control group (patients with NASHinduced cirrhosis) when compared to patients with minimal fibrosis.

| Chemokine | Fold change (p-value) | "M1" classical activation | Fold change (p-value) | "M2" Alternative activation | Fold change (p-value) | Fibrosis | Fold change (p-value) | Signaling molecules | Fold change (p-value) | Transcription factors | Fold change (p-value) |
|-----------|----------------------|---------------------------|----------------------|-----------------------------|-----------------------|----------|----------------------|---------------------|----------------------|----------------------|----------------------|
| CCL2 | 6.17 (0.001) | CD68 | -1.22 (0.134) | CD163 | -1.66 (0.00) | STAT3 | -1.15 (0.403) | Btk | 2.55 (0.006) | STAT1 | 1.81 (0.005) |
| CCL3 | 1.03 (0.895) | CD86 | 3.47 (0.017) | CD200/ MRC1 | 1.06 (0.820) | TGFB1 | 2.51 (0.000) | SOCS1 | -1.01 (0.989) | IRF1 | 1.47 (0.030) |
| CCL4 | 1.19 (0.496) | CD80 | 2.20 (0.140) | FCER2/ CD23 | -2.39 (0.064) | TGFB2 | 15.10 (.000) | MyD88 | -1.12 (0.388) | IRF5 | 1.27 (0.230) |
| CCL5 | 2.13 (0.002) | IL1R1 | 1.15 (0.211) | CD209/ DCSIGN | 1.04 (0.925) | TREM1 | -4.36 (0.009) | TICAM1 | 1.15 (0.387) | IRF8 | 1.67 (0.006) |

TABLE 4-continued

NanoString showed significantly different gene expression in the positive control group (patients with NASHinduced cirrhosis) when compared to patients with minimal fibrosis.

| Chemokine | Fold change (p-value) | "M1" classical activation | Fold change (p-value) | "M2" Alternative activation | Fold change (p-value) | Fibrosis | Fold change (p-value) | Signaling molecules | Fold change (p-value) | Transcription factors | Fold change (p-value) |
|---|---|---|---|---|---|---|---|---|---|---|---|
| CCL8 | 1.09 (0.855) | TLR2 | −1.11 (0.549) | CLEC7A | 2.09 (0.002) | CSF1R | −1.36 (0.536) | AKT3 | 1.59 (0.004) | STAT5B | −1.00 (0.966) |
| CCL11 | −1.20 (0.733) | TLR3 | 1.22 (0.419) | MSR1/ CD204 | 1.11 (0.652) | MERTK | −1.30 (0.178) | SYK | 2.34 (0.002) | STAT6 | 1.06 (0.677) |
| CXCL10 | 6.15 (0.001) | TLR4 | 1.01 (0.953) | TLR1 | 2.22 (0.002) | | | PIK3CD | 2.86 (0.001) | IRF4 | 2.63 (0.039) |
| CXCL9 | 6.06 (0.000) | TLR7 | 6.06 (0.001) | TLR8 | 1.73 (0.310) | Cytokines | | PIK3CG | 4.62 (0.000) | NFKB1 | 1.20 (0.501) |
| CCL17 | 1.55 (0.171) | TLR9 | −1.12 (0.849) | IL4R | −1.62 (0.047) | | | HRAS | 1.34 (0.121) | PPARG | −1.04 (0.842) |
| CCL22 | 0.78 (0.012) | FCGR1/ CD64 | 4.99 (0.016) | FCER1G | 1.08 (0.767) | IL1B | 1.97 (0.227) | MAPK1 | 1.09 (0.575) | STAT3 | −1.15 (0.403) |
| CCL24 | −2.14 (0.386) | CD14 | −1.89 (0.001) | IL10RA | 1.01 (0.991) | TNF | 28.80 (.000) | | | MAF | 1.02 (0.886) |
| CCR2 | 4.65 (0.001) | MARCO | −2.26 (0.009) | CSF1R | −1.36 (0.536) | IL12A | −1.12 (0.829) | Enzymes | | | |
| CXCL13 | 10.80 (.010) | HLA-DRA | 2.23 (0.026) | PDCD1L/ PDL2 | 1.08 (0.802) | IL23A | −1.03 (0.946) | | | | |
| CXCL5 | 1.51 (0.509) | HLA-DRB3 | 1.92 (0.004) | CD274/ PDL1 | 1.01 (0.991) | IFNG | 2.04 (0.203) | IDO1 | 4.06 (0.005) | | |
| CCL18 | 1.82 (0.438) | HLA-DRB4 | 4.35 (0.456) | CD36 | 1.11 (0.543) | IL18 | 1.97 (0.006) | PTGS2 | −1.09 (0.874) | | |
| | | | | CD18 | 3.44 (0.067) | IL-10 | −9.71 (0.002) | ARG1 | −1.68 (0.002) | | |
| | | | | FCGR3A/ CD16 | −1.04 (0.882) | IL-21 | 1.00 (n/a) | | | | |

Table 4. NanoString showed significantly different gene expression in the positive control group (patients with NASHinduced cirrhosis) when compared to patients with minimal fibrosis. We submitted the 24 samples from Table 3 (minimal fibrosis group, n=12; advanced fibrosis group, n=12) for NanoString analysis. RNA expression was analyzed using the PanCancer Immune Profiling Panel and the nCounter Sprint profiler. Data analysis was performed with nSolver Advanced Analysis Module. The inventors generated normalized, log 2 transformed data of genes in each sample and the differential expression gene list. Fold changes shown are in the advanced fibrosis group compared to the minimal fibrosis group. Significantly upregulated (Green) and downregulated (Red) genes are shown (p<0.05). Importantly, several of the genes included in the spectral imaging panels (Table 4) were significantly up- (e.g., CCL2/CCR2 and CCL5/CCR5) or down- (e.g., CD14 and CD163) regulated. Other genes that are critical in regulating both resident and monocyte-derived Macs via CXCL 13 (TNF and IL-10) (62, 63) showed significant fold changes. TGFbeta-2 was also showed highly significant fold changes, which has been reported in the literature in mouse models of fibrosis and HCC (64). Additional genes to be analyzed with Nano String: CCL1, CCL13, CXCL8, HMGB1, HLA-DR, HLA-DPB1, HLA-DRB1, CD74, NOS2, ROS1, MMP2, MMP9, TGM2, HMOX1, CHI3L1, TIMP1, MMP12, MMP13, ALOX15, LLGL1, PTGS1, CYP2S1, PPARGC1A, PPARGC1B, LYZ, TGFB3, LGALS3, LGALS9, PTEN, SERPINE1, COL6A3, FCN1, IL-6, PDGFA, PDGFB, VEGF, IGF-1, IL1RN, TNFR1, P2RY1, SOCS3, AKT1, S100A12, AKT2, PFKFB3, TSC1, mTOR, BMP3, FABP4, NR1H3, P13K, KRAS, NRAS, SOCSS2, PRKAA1, PFKFB1, SHPK, MIR27A, TYROBP, VSIG4, CSAR1, VCAM1, STATSA, C-JUN, NFKB/RELA, NFKB/RELB, GATA6, KLF4, EPAS1, EP1, H1F1A, MYC, SMAD1-9, CSF1, FCRG, SLAMF1/CD150, 1L13RA1, IL13RA2, each of which can be found in, e.g., www.genecards.org.

A set of genes known to be pro-fibrotic or expressed by Macs can be analyzed, to recruit monocytes/Macs, and to enhance activation and differentiation of LSECs and HSCs. A Group NP (non-progressors) is expected to have a more tolerogenic gene profile and the Group RP (rapid progressors) is expected to have a more pro-inflammatory, pro-fibrotic gene profile. Biopsies from Group RP patients are expected to show significant upregulation of several of the genes observed in the NASH advanced fibrosis group, particularly those involved in monocyte recruitment (e.g., CCL2/CCR2 and CCL5/CCR5), regulation of Macs (e.g., TNF, IL-10 and CXCL13), a shift towards a pro-fibrotic state (e.g., TGF-beta-1/2), and activation/differentiation of HSCs/myofibroblasts. Group NP will have increased expression of CD14, MARCO, and IL-10 (a more tolerogenic phenotype) and decreased expression of CCL2, CCL5, CXCL13 and TGF-beta-2 when compared to the RP group, which will have results similar to the cirrhosis group. Importantly, many of these genes are therapeutic targets for developing antifibrotic treatments (e.g., CCL2, CCR2, and CCL5). Finally, RP patients with pro-fibrotic microenvironments early in the disease course will have significantly upregulated genes involved in the main upstream regulator pathways associated with LPS.

TABLE 5

NanoString showed upregulated gene expression in Cirrhosis F4 vs non-cirrhosis/Fibrosis 3 vs Fibrosis 1/cirrhosis F4 vs Fibrosis F3

| Gene Name | Fold Change (P value < 0.05) |
|---|---|
| S100A8 | 8.5 |
| CXCL6 | 8.7 |

TABLE 5-continued

NanoString showed upregulated gene expression
in Cirrhosis F4 vs non-cirrhosis/Fibrosis 3 vs
Fibrosis 1/cirrhosis F4 vs Fibrosis F3

| Gene Name | Fold Change (P value < 0.05) |
|---|---|
| CCL21 | 7.1 |
| CXCR3 | 5.7 |
| PLAU | 4.8 |
| CD27 | 5.7 |
| CEACAM6 | 10.4 |
| F13A1 | 10.5 |
| ANXA1 | 5.1 |
| CTLA4 | 3.4 |
| CCL19 | 3.2 |
| MS4A1 | 5.6 |
| ITGA2 | 6.7 |
| ITGB4 | 5.2 |
| IL8 | 5.1 |
| RAS | 5.1 |
| CDK1 | 5.0 |

Figure 8:
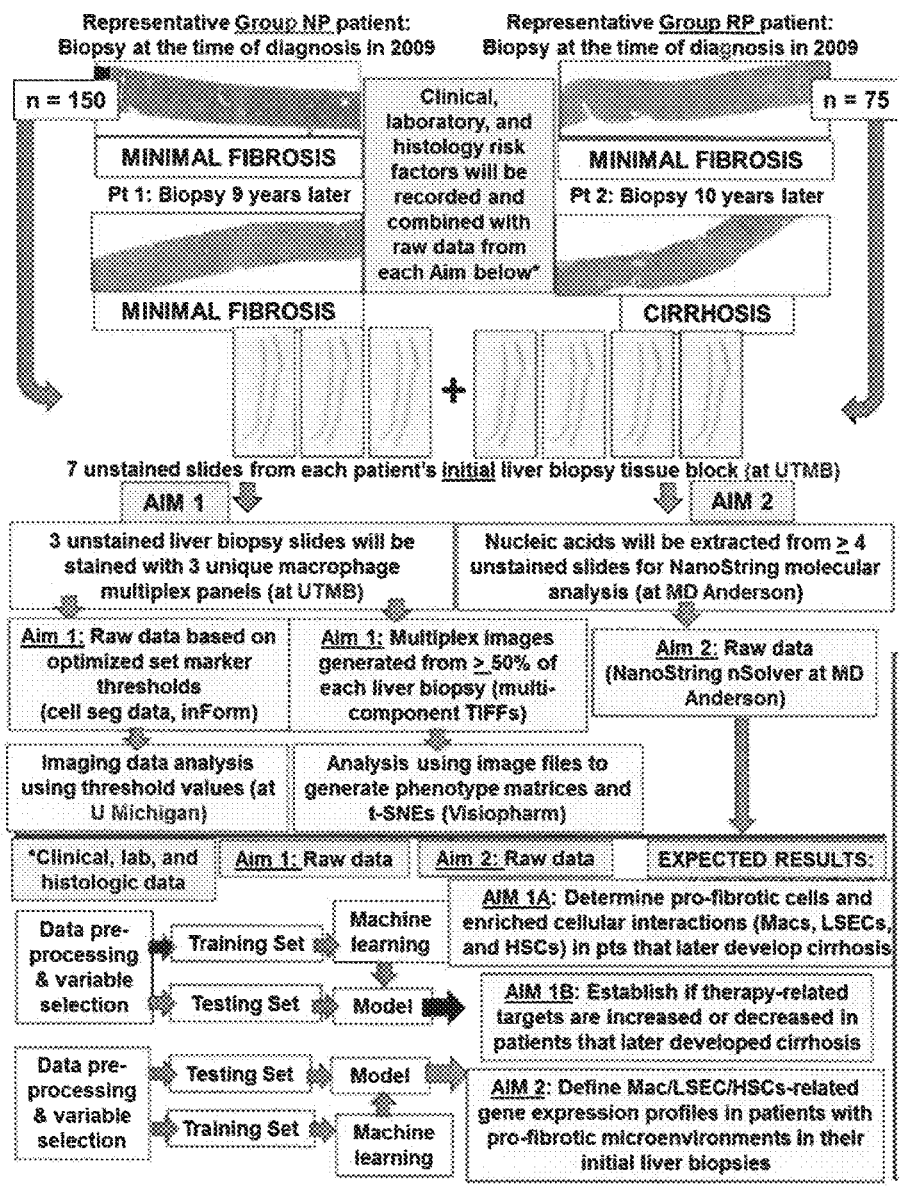
FIG. 8 is a flowchart that shows two workflows for determining: (1A) pre-fibrotic cells and enriched cellular interactions, (1B) establishing therapy related targets, and (2) defining Mac/LSEC/HSCs-related gene expression profiles in patients with pre-fibrotic microenvironments in their liver biopsies.

FIG. 8 is a flowchart that shows two workflows for determining: (1A) pre-fibrotic cells and enriched cellular interactions, (1B) establishing therapy related targets, and (2) defining Mac/LSEC/HSCs-related gene expression profiles in patients with pre-fibrotic microenvironments in their liver biopsies. In FIG. 8 the workflow includes two aims: Aims 1 & 2. Initial liver biopsies are analyzed from patients diagnosed with different chronic liver diseases that had minimal/mild fibrosis [stages 0-1 out of 4 (for NASH and AALD), or 0-1 out of 6 (for AIH and CHC)]. Patients considered to be non-progressors (Group NP, n=150) based on their second liver biopsy include fibrosis stages 0-1 out of 4 or 0-2 out of 6 (30, 31). Those considered to be rapid progressors (Group RP, n=75) include those with at least incomplete cirrhosis observed in their second liver biopsy/explant tissue (fibrosis stages 3 to 4 out of 4, or 5 to 6 out of 6) (30, 31). Positive (cirrhosis patients, n=25) and negative (minimal histologic changes and normal liver enzymes at the time of biopsy, n=25) controls will also be included. Adequate yields from tissue are confirmed for this approach; 10-15 unstained slides were obtained from each block for a NASH equilibrium experiment.

ABBREVIATIONS: AALD: Alcohol-associated liver disease; AIH: Autoimmune hepatitis; ALT: Alanine aminotransferase; AST: Aspartate aminotransferase; BMI: Body mass index; CHC: Chronic hepatitis C; CPA: Collagen proportionate area; FFPE: Formalin-fixed paraffin-embedded; Group NP: Pts with minimal fibrosis progression; Group RP: Pts with rapid fibrosis progression; HCC: Hepatocellular carcinoma; HCV: Hepatitis C virus; HIV: Human immunodeficiency virus; HSC: Hepatic stellate cells; LOS: Letter of support; LSEC: Liver sinusoidal endothelial cell; Mac/s: Macrophage/s; MHAI: Modified hepatitis activity index; NAFLD: Non-alcoholic fatty liver disease; NAS: NAFLD activity score; NASH: non-alcoholic steatohepatitis; PBC: Primary biliary cholangitis; ROI: Region of interest; TSA: Tyramide signal amplification; t-SNE: t-stochastic neighbor embedding To facilitate the understanding of this invention, a number of terms are defined below. Terms defined herein have meanings as commonly understood by a person of ordinary skill in the areas relevant to the present invention. Note that these terms may be used interchangeably without limiting the scope of the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

All of the systems, devices, computer programs, compositions and/or methods disclosed and claimed herein can be made and executed without undue experimentation in light of the present disclosure. While the systems, devices, computer programs, compositions and methods of this invention have been described in terms of preferred embodiments, it will be apparent to those of skill in the art that variations may be applied to the systems, devices, computer programs, compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. Tacke F, Zimmermann H W. Macrophage heterogeneity in liver injury and fibrosis. J Hepatol 2014; 60:1090-1096.
2. Knodell R G, Ishak K G, Black W C, Chen T S, Craig R, Kaplowitz N, Kiernan T W, et al. Formulation and application of a numerical scoring system for assessing histological activity in asymptomatic chronic active hepatitis. Hepatology 1981; 1:431-435.
3. Reid D T, Reyes J L, McDonald B A, Vo T, Reimer R A, Eksteen B. Kupffer Cells Undergo Fundamental Changes during the Development of Experimental NASH and Are Critical in Initiating Liver Damage and Inflammation. PLOS One 2016; 11: e0159524.
4. Friedman S L, Ratziu V, Harrison S A, Abdelmalek M F, Aithal G P, Caballeria J, Francque S, et al. A randomized, placebo-controlled trial of cenicriviroc for treatment of nonalcoholic steatohepatitis with fibrosis. Hepatology 2018; 67:1754-1767.
5. Tacke F. Cenicriviroc for the treatment of non-alcoholic steatohepatitis and liver fibrosis. Expert Opin Investig Drugs 2018; 27:301-311.
6. Siddiqui M S, Harrison S A, Abdelmalek M F, Anstee Q M, Bedossa P, CasteraL, Dimick-Santos L, et al. Case definitions for inclusion and analysis of endpoints in clinical trials for nonalcoholic steatohepatitis through the lens of regulatory science. Hepatology 2018; 67:2001-2012.
7. Kazankov K, Jorgensen S M D, Thomsen K L, Moller H J, Vilstrup H, George J, Schuppan D, et al. The role of macrophages in nonalcoholic fatty liver disease and non-alcoholic steatohepatitis. Nat Rev Gastroenterol Hepatol 2018.
8. Bility M T, Nio K, Li F, McGivern D R, Lemon S M, Feeney E R, Chung R T, et al. Chronic hepatitis C infection-induced liver fibrogenesis is associated with M2 macrophage activation. Sci Rep 2016; 6:39520.
9. Gadd V L, Melino M, Roy S, Horsfall L, O'Rourke P, Williams M R, Irvine K M, et al. Portal, but not lobular, macrophages express matrix metalloproteinase-9: association with the ductular reaction and fibrosis in chronic hepatitis C. Liver Int 2013; 33:569-579.
10. Yeung O W, Lo C M, Ling C C, Qi X, Geng W, Li C X, Ng K T, et al. Alternatively activated (M2) macrophages promote tumor growth and invasiveness in hepatocellular carcinoma. J Hepatol 2015; 62:607-616.
11. Mano Y, Aishima S, Fujita N, Tanaka Y, Kubo Y, Motomura T, Taketomi A, et al. Tumor-associated macrophage promotes tumor progression via STAT3 signaling in hepatocellular carcinoma. Pathobiology 2013; 80:146-154.
12. Stack E C, Wang C, Roman K A, Hoyt C C. Multiplexed immunohistochemistry, imaging, and quantitation: a review, with an assessment of Tyramide signal amplification, multispectral imaging and multiplex analysis. Methods 2014; 70:46-58.
13. Feng Z, Puri S, Moudgil T, Wood W, Hoyt C C, Wang C, Urba W J, et al. Multispectral imaging of formalin-fixed tissue predicts ability to generate tumor-infiltrating lymphocytes from melanoma. J Immunother Cancer 2015; 3:47.
14. Zaretsky J M, Garcia-Diaz A, Shin D S, Escuin-Ordinas H, Hugo W, Hu-Lieskovan S, Torrejon D Y, et al. Mutations Associated with Acquired Resistance to PD-1 Blockade in Melanoma. N Engl J Med 2016; 375:819-829.
15. Stack E C, Foukas P G, Lee P P. Multiplexed tissue biomarker imaging. J Immunother Cancer 2016; 4:9.
16. Huang W, Hennrick K, Drew S. A colorful future of quantitative pathology: validation of Vectra technology using chromogenic multiplexed immunohistochemistry and prostate tissue microarrays. Hum Pathol 2013; 44:29-38.
17. Liu X D, Hoang A, Zhou L, Kalra S, Yetil A, Sun M, Ding Z, et al. Resistance to Antiangiogenic Therapy Is Associated with an Immunosuppressive Tumor Microenvironment in Metastatic Renal Cell Carcinoma. Cancer Immunol Res 2015; 3:1017-1029.
18. Mlecnik B, Bindea G, Kirilovsky A, Angell H K, Obenauf A C, Tosolini M, Church S E, et al. The tumor microenvironment and Immunoscore are critical determinants of dissemination to distant metastasis. Sci Transl Med 2016; 8:327ra326.
19. Chalasani N, Younossi Z, Lavine J E, Charlton M, Cusi K, Rinella M, Harrison S A, et al. The diagnosis and management of nonalcoholic fatty liver disease: Practice guidance from the American Association for the Study of Liver Diseases. Hepatology 2018; 67:328-357.
20. Kleiner D E, Brunt E M, Van Natta M, Behling C, Contos M J, Cummings O W, Ferrell L D, et al. Design and validation of a histological scoring system for non-alcoholic fatty liver disease. Hepatology 2005; 41:1313-1321.
21. Rockey D C, Caldwell S H, Goodman Z D, Nelson R C, Smith A D. Liver biopsy. Hepatology 2009; 49:1017-1044.
22. Huang Y, de Boer W B, Adams L A, MacQuillan G, Bulsara M K, Jeffrey G P. Image analysis of liver biopsy samples measures fibrosis and predicts clinical outcome. J Hepatol 2014; 61:22-27. Stevenson-Lerner, Heather, Pinnacle Research Award 23. Friedman S, Sanyal A, Goodman Z, Lefebvre E, Gottwald M, Fischer L, Ratziu V. Efficacy and safety study of cenicriviroc for the treatment of non-alcoholic steatohepatitis in adult subjects with liver fibrosis: CENTAUR Phase 2b study design. Contemp Clin Trials 2016; 47:356-365.
24. Krenkel O, Puengel T, Govaere O, Abdallah A T, Mossanen J C, Kohlhepp M, Liepelt A, et al. Therapeutic inhibition of inflammatory monocyte recruitment reduces steatohepatitis and liver fibrosis. Hepatology 2018; 67:1270-1283.
25. Hepatitis C Guidance 2018 Update: AASLD-IDSA Recommendations for Testing, Managing, and Treating Hepatitis C Virus Infection. Clin Infect Dis 2018; 67:1477-1492.
26. Lin R, Zhang J, Zhou L, Wang B. Altered function of monocytes/macrophages in patients with autoimmune hepatitis. Mol Med Rep 2016; 13:3874-3880.
27. Zhang J, Guo L, Liu M, Jing Y, Zhou S, Li H, Li Y, et al. Receptor-interacting protein kinase 3 mediates macrophage/monocyte activation in autoimmune hepatitis and regulates interleukin-6 production. United European Gastroenterol J 2018; 6:719-728.
28. Guo L P, Zhou L, Li H X, Zhang J, Wang B M. [The study of liver macrophages polarization in patients with autoimmune hepatitis]. Zhonghua Nei Ke Za Zhi 2017; 56:763-765.
29. Hennes E M, Zeniya M, Czaja A J, Pares A, Dalekos G N, Krawitt E L, Bittencourt P L, et al. Simplified criteria for the diagnosis of autoimmune hepatitis. Hepatology 2008; 48:169-176.
30. Manns M P, Czaja A J, Gorham J D, Krawitt E L, Mieli-Vergani G, Vergani D, Vierling J M. Diagnosis and management of autoimmune hepatitis. Hepatology 2010; 51:2193-2213.

What is claimed is:

1. A method of macrophage phenotype profiling for determining a risk of developing of fibrosis and/or cirrhosis within the liver, comprising the steps of:
   a) obtaining a liver biopsy sample from a subject;
   b) using digital images and a machine learning algorithm to generate a machine learning model that automatically identifies, quantifies, and determines liver fibrosis and/or cirrhosis from a level of expression of macrophage profiling markers and a location of the macrophages expressing CD68, Mac387, and CD163 in the liver biopsy sample by:
   c) contacting antibodies attached to fluorescent probes to the liver biopsy sample to detect macrophage profiling markers and imaging multiple regions of interest in the liver biopsy sample to detect a location and a level of expression of the macrophage profiling markers in the liver biopsy sample, wherein the macrophage profiling markers are CD68, Mac387, and CD163, and 4',6-diamidino-2-phenylindole (DAPI) staining; and
   (d) using spectral analysis and the machine learning model to automatically identify, quantify, and correlate from the digital images of the multiple regions of interest in the liver biopsy sample the location and level of expression of the macrophage profiling markers in the liver biopsy sample relative to a control or standard liver biopsy sample from one or more subjects that do not have fibrosis and/or cirrhosis within the liver to calculate the risk of developing fibrosis and/or cirrhosis.

2. The method of claim 1, wherein the macrophage profiling markers are surface bound protein markers, secreted protein markers, mRNA, or combinations thereof.

3. The method of claim 2, wherein the macrophage profiling markers further comprise at least 2, 3, or 4 markers selected from CD206, TGF-β/IL-10, and MMP1.

4. The method of claim 1, wherein the one or more fluorescent probes have a functional group with a spectral emission between 400-800 nm.

5. The method of claim 1, wherein the sample is selected from the group consisting of liver tumor tissue, liver normal tissue, frozen biopsy tissue, paraffin-embedded biopsy tissue, and combinations thereof.

6. The method of claim 1, wherein detection of the macrophage profiling markers is by using spectral imaging microscopy and imaging analysis.

7. The method of claim 6, wherein the spectral imaging microscopy is utilized to image hepatic architecture for the assessment and determination of the location of cells expressing the macrophage profiling markers within a hepatic microenvironment.

8. The method of claim 1, wherein artificial intelligence and/or machine learning is employed to automatically identify, quantify correlate macrophage profiling marker expression levels between samples and controls, standards, or combinations thereof.

9. The method of claim 1, wherein the macrophage profiling markers are at least one of: (1) tolerogenic/anti-inflammatory macrophages that are CD68+/CD16++ or Mac387+/CD16++; or (2) resident pro-inflammatory macrophages characterized by CD68+/CD14++ or Mac387+/CD14++, or both.

10. The method of claim 1, wherein if the subject has fibrosis and a macrophage profiling marker/antibody complex shows CD163+/CD16+, CD68+/Mac387+, and CD68+ macrophages this is indicative of fibrosis due to chronic hepatitis C (HCV+) macrophages; or if the patient has fibrosis and the macrophage profiling marker/antibody complex shows CD163+/Mac387+, CD16+/CD163+/Mac387+, and CD68+ macrophages these patients have non-alcoholic steatohepatitis (NASH) macrophages.

11. A method of macrophage phenotype profiling for determining a risk of development of fibrosis and/or cirrhosis within the liver, comprising the steps of:
   (a) obtaining an image of a fluorescently labeled liver biopsy sample from a subject;
   (b) using spectral analysis and a machine learning algorithm to generate a machine learning model to automatically identify, quantify, and determine liver fibrosis and/or cirrhosis from a level of expression of macrophage profiling markers, wherein the machine learning model analyzes an image of the fluorescently labeled liver biopsy sample compared to a control or standard liver biopsy sample from a subject that does not have a fibrosis and/or cirrhosis within the liver,
   wherein the machine learning algorithm compared sample data for NanoString analysis to liver RNA expression data from a PanCancer Immune Profiling Panel and an nCounter Sprint profiler to gene expression levels in the liver RNA expression data;
   wherein the liver RNA expression data was normalized and log 2 transformed for genes in the subject with liver fibrosis or cirrhosis and for the control or standard liver biopsy sample; and
   wherein the machine learning algorithm identified CD14, CD16, CD68, CD163, and Mac387 as upregulated in liver fibrosis and cirrhosis when compared to the control or standard liver biopsy sample; and (c) applying the machine learning model to the image of the liver biopsy sample to calculate a relative level of expression and location of the macrophage profiling marker expression levels in the image of the liver biopsy sample, wherein an increase in the expression of CD68, Mac387, and CD163, when compared to the control or standard liver biopsy sample and the location within a hepatic microenvironment is used to detect liver fibrosis and/or cirrhosis.

12. The method of claim 11, wherein the macrophage profiling markers further comprise CD14 and CD16.

13. The method of claim 11, further comprising an anti-inflammatory/restorative markers comprising at least 2, 3, 4, or 5 markers selected from CD206, TGF-β/IL-10, MMP1, and DAPI.

14. The method of claim 11, wherein the macrophage profiling markers are surface bound protein markers, secreted protein markers, mRNA, or combinations thereof.

15. The method of claim 11, wherein the fluorescent probes used to measure macrophage profiling marker expression levels have a functional group with a spectral emission between 400-800 nm.

16. The method of claim 11, wherein the sample is selected from the group consisting of liver tumor tissue, liver normal tissue, frozen biopsy tissue, paraffin-embedded biopsy tissue, and combinations thereof.

17. The method of claim 11, wherein the detection of a macrophage profiling marker/antibody complex is achieved by using spectral imaging microscopy and imaging analysis.

18. The method of claim 17, wherein the spectral imaging microscopy is utilized to conserve the hepatic architecture for the assessment and determination of the location of these cells within the complex microenvironment.

19. The method of claim 11, wherein artificial intelligence and/or machine learning is employed to automatically identify, quantify correlate marker expression levels between samples and controls, standards, or combinations thereof.

20. The method of claim 11, wherein the macrophage profiling marker shows at least one of: (1) tolerogenic/anti-inflammatory macrophages that are CD68+/CD16++ or Mac387+/CD16++; or (2) resident pro-inflammatory macrophages characterized by CD68+/CD14++ or Mac387+/CD14++, or both.

21. The method of claim 11, wherein if the subject has fibrosis and the macrophage profiling markers are: CD163+/CD16+, CD68+/Mac387+, and CD68+ macrophages, this is indicative of fibrosis due to chronic hepatitis C (HCV+) macrophages; or if the patient has fibrosis and the macrophage profiling marker/antibody complex shows CD163+/Mac387+, CD16+/CD163+/Mac387+, and CD68+ macrophages these patients have non-alcoholic steatohepatitis (NASH) macrophages.

* * * * *